US007887145B2

(12) United States Patent
Niino et al.

(10) Patent No.: US 7,887,145 B2
(45) Date of Patent: Feb. 15, 2011

(54) VEHICLE BRAKE CONTROL DEVICE

(75) Inventors: Hiroaki Niino, Toyota (JP); Takashi Sato, Okazaki (JP)

(73) Assignee: Advics Co., Ltd., Aichi-pref. (JP)

( * ) Notice: Subject to any disclaimer, the term of this patent is extended or adjusted under 35 U.S.C. 154(b) by 1043 days.

(21) Appl. No.: 11/700,936

(22) Filed: Feb. 1, 2007

(65) Prior Publication Data
US 2007/0210642 A1  Sep. 13, 2007

(30) Foreign Application Priority Data
Mar. 1, 2006 (JP) ............................ 2006-054751

(51) Int. Cl.
*B60T 8/34* (2006.01)
(52) U.S. Cl. .................. 303/113.4; 303/11; 303/20; 303/119.1; 303/116.1; 303/155
(58) Field of Classification Search ............ 303/10, 303/11, 20, 113.1, 113.4, 116.1, 119.1, 155, 303/156, 157, 158; 701/70, 71, 78, 82, 83
See application file for complete search history.

(56) References Cited

U.S. PATENT DOCUMENTS

| 6,086,167 | A | 7/2000 | Heckmann et al. | |
|---|---|---|---|---|
| 6,113,197 | A | 9/2000 | Kuroki et al. | |
| 6,234,588 | B1 | 5/2001 | Sawada | |
| 7,469,974 | B2 * | 12/2008 | Maki et al. | 303/11 |
| 7,621,602 | B2 * | 11/2009 | Sato et al. | 303/11 |
| 7,621,603 | B2 * | 11/2009 | Sato et al. | 303/11 |
| 2004/0222695 | A1 | 11/2004 | Miyazaki | |

FOREIGN PATENT DOCUMENTS

| JP | A-10-194099 | 7/1998 |
|---|---|---|
| JP | A-10-203338 | 8/1998 |
| JP | A-11-301435 | 11/1999 |
| JP | A-2004-322660 | 11/2004 |
| JP | A-2005-231395 | 9/2005 |
| JP | A-2005-306172 | 11/2005 |

OTHER PUBLICATIONS

First Office Action issued from the Japanese Patent Office on Dec. 7, 2010 in the corresponding Japanese patent application No. 2006-054751 (a copy and English translation thereof).

* cited by examiner

*Primary Examiner*—Thomas J Williams
(74) *Attorney, Agent, or Firm*—Posz Law Group, PLC

(57) ABSTRACT

In a vehicle brake control device, a target W/C pressure depending on an amount of operation performed to a brake operating member, exhibits hysteresis due to a forward mapping dataset and a backward mapping dataset. The vehicle brake control device selects the forward mapping dataset or the backward mapping dataset based on the amount of operation performed to the brake operating member, and determines a current value of a current to be supplied to one of first to fourth linear valves. Therefore, it is possible to prevent a wheel cylinder pressure from changing too sensitively to the operation to the brake operating member and from changing even when the driver is not intentionally operating the brake operating member. This makes the driver experience an improved brake feeling.

8 Claims, 16 Drawing Sheets

|  | NORMAL BRAKING | ABNORMAL BRAKING |
|---|---|---|
| SNO1 | ON (CLOSED) | OFF (OPEN) |
| SNO2 | ON (CLOSED) | OFF (OPEN) |
| SWC1 | ON (OPEN) | OFF (CLOSED) |
| SWC2 | ON (OPEN) | OFF (CLOSED) |
| SLFR | DUTY | OFF (OPEN) |
| SLRL | DUTY | OFF (OPEN) |
| SLFL | DUTY | OFF (OPEN) |
| SLRR | DUTY | OFF (OPEN) |
| SCSS | ON (OPEN) | OFF (CLOSED) |
| FIRST & SECOND MOTOR | ON | OFF |

FIG. 5

VEHICLE BRAKE CONTROL DEVICE

CROSS REFERENCE TO RELATED APPLICATION

This application is based on and incorporates herein by reference Japanese patent application No. 2006-54751 filed on Mar. 1, 2006.

FIELD OF THE INVENTION

The present invention relates to a vehicle brake control device which generates pressures (hereinafter referred to as W/C pressures) in wheel cylinders (hereinafter referred to as W/Cs) by causing pumps to apply pressures.

BACKGROUND OF THE INVENTION

In Japanese Patent Publication No. H10-203338, a brake-by-wire vehicle brake control device is proposed which has four pumps respectively for the four wheels of a vehicle. Two of the four pumps are located in a common conduit system for two of the four wheels and are driven by a common motor. The other two of the four pumps are located in another common conduit system for the other two of the four wheels and are driven by another common motor.

The inventor of the present invention gave consideration to the vehicle brake control device described above and found that pressure adjusting circuits can be installed respectively to the W/Cs and that linear valves can also be installed to the pressure adjusting circuits. In this case, differential pressures of the linear valves can be controlled by adjusting current values of currents to be supplied to the linear valves, in order to adjust the W/C pressures. Each of the differential pressures is a difference of pressure generated at the upstream side and the downstream side of a corresponding linear valve. Since the W/C pressures can be adjusted simply by controlling the current values for the linear valves, the W/C pressure changes in quick response to the amount of the operation of the brake pedal performed by a driver. More specifically, the W/C pressure can be controlled to change linearly depending on a pressure (hereinafter referred to as an M/C pressure) of a master cylinder (hereinafter referred to as an M/C) which changes in accordance with the amount of the operation of the brake pedal.

In this case, however, the W/C pressure changes so sensitively to the operation to the brake pedal that it changes even when the driver is not intentionally operating the brake pedal. This causes the driver to experience a bad brake feeling.

SUMMARY OF THE INVENTION

It is therefore an object of the present invention to provide a vehicle brake control device which adjusts W/C pressures by using linear valves and still makes a driver experience an improved brake feeling.

Control means of a vehicle brake control device of the present invention includes: (A) a first storing portion for storing a forward mapping dataset and a backward mapping dataset each for indicating change of a wheel cylinder pressure generated at one of a first front wheel, a second front wheel, a first rear wheel, and a second rear wheel, the change being in accordance with an operation amount of a brake operating member, wherein: the forward mapping dataset is for an operation increasing process in which the operation amount increases; and the backward mapping dataset is for an operation decreasing process in which the operation amount decreases and exhibits hysteresis against the forward mapping dataset; (B) a first selecting portion for selecting one of the forward mapping dataset and the backward mapping dataset based on the operation amount detected by a operation amount sensor; (C) a pressure calculating portion for calculating, based on the selected one of the forward mapping dataset and the backward mapping dataset, a target wheel cylinder pressure corresponding to the detected operation amount; and (D) an adjusting portion for adjusting, based on the calculated target wheel cylinder pressure, a current value of a current to be supplied to one of first to fourth linear valves.

As described above, in the vehicle brake control device of the present embodiment, the target W/C pressure depending on the amount of operation performed to the brake operating member, exhibits hysteresis due to the forward mapping dataset and the backward mapping dataset. The vehicle brake control device selects the forward mapping dataset or the backward mapping dataset based on the amount of operation performed to the brake operating member, and determines the current value of the current to be supplied to one of the first to fourth linear valves.

Therefore, it is possible to prevent the W/C pressure from changing too sensitively to the operation to the brake operating member and from changing even when the driver is not intentionally operating the brake operating member. This makes the driver experience an improved brake feeling.

A vehicle brake control device of the present invention may include a pressure sensor for outputting a detection signal corresponding to a fluid pressure of brake fluid changing in accordance with an operation amount of the brake operation member and may detect the operation amount by means of the detection signal from the pressure sensor, in spite of detecting it by means of the operation amount sensor. For example, the pressure sensor may be one which detects a master cylinder pressure in the master cylinder.

The first selecting portion may select the forward mapping dataset when the operation amount is zero.

By selecting the forward mapping dataset when the operation amount is zero, the forward mapping dataset has been selected at the time where the driver starts operating the brake operating member.

The selection of the forward mapping dataset and the backward mapping dataset can be changed in a manner as follows. The vehicle brake control device further includes a forward/backward pressure calculating portion for calculating, based on the forward mapping dataset, a forward wheel cylinder pressure corresponding to the operation amount and calculating, based on the backward mapping dataset, a backward wheel cylinder pressure corresponding to the operation amount. In addition, the first selecting portion: (A) performs when the forward mapping dataset is selected: (A1) selecting the larger one of the forward wheel cylinder pressure and a previously calculated target wheel cylinder pressure as a first wheel cylinder pressure; and (A2) selecting the backward wheel cylinder pressure as a second wheel cylinder pressure, (B) performs when the backward mapping dataset is selected: (B1) selecting the forward wheel cylinder pressure as the first wheel cylinder pressure; and (B2) selecting the smaller one of the backward wheel cylinder pressure and the previously calculated target wheel cylinder pressure as the second wheel cylinder pressure, (C) compares the first wheel cylinder pressure and the second wheel cylinder pressure, and (D) switches a selection of one of the forward mapping dataset and the backward mapping dataset when the first wheel cylinder pressure is larger than the second wheel cylinder pressure.

The control means may further include: (A) a determination portion for determining whether the calculated target wheel cylinder pressure is in a pressure increasing process in which the target wheel cylinder pressure is increasing or in a pressure decreasing process in which the target wheel cylinder pressure is decreasing; (B) a second storing portion for storing an increasing mapping dataset and a decreasing mapping dataset each for indicating change of the current value of the current to be supplied to the one of the first to fourth linear valves, the change being in accordance with the calculated target wheel cylinder pressure, wherein: the increasing mapping dataset is for use in the pressure increasing process; and the decreasing mapping dataset is for use in the pressure decreasing process and exhibits hysteresis against the increasing mapping dataset; and (C) a second selecting portion for selecting one of the increasing mapping dataset and the decreasing mapping dataset based on the calculated target wheel cylinder, wherein the adjusting portion calculates, based on the calculated target wheel cylinder pressure and on the selected one of the increasing mapping dataset and the decreasing mapping dataset, the current value to be supplied to the one of the first to fourth linear valves.

As described above, the vehicle brake control device may determine the current value of the current to be supplied to one of the first to fourth linear valves by means of the target wheel cylinder pressure calculated by the pressure calculating portion and the mapping datasets stored in the second storing portion. Consequently, the determined current value reflects characteristics of one of the first to fourth linear valves. It is therefore possible to determine the current value for the one of the first to fourth linear valves based on whether the target wheel cylinder pressure is increasing or decreasing. As a result, it is possible to avoid a problem in which the differential pressure and the generated wheel cylinder pressure does not change even if the current value for the one of the first to fourth linear valves changes based on the increase or decrease of the target wheel cylinder pressure.

When a selection of one of the forward mapping dataset and the backward mapping dataset made by the first selecting portion changes, the adjusting portion may execute a stepwise current control in which the current value to be supplied to the one of the first to fourth linear valves is changed is in a stepwise manner.

Thus, the calculated current value gradually changes in time, which prevents the driver from experiencing an uncomfortable brake feeling that the generated W/C pressure suddenly jumps up or down.

In addition, the adjusting portion may perform at the first step in the stepwise current control: (A) calculating a first current value based on a target wheel cylinder calculated previously by the pressure calculating portion and on one of the forward mapping dataset and the backward mapping dataset which is previously selected by the first selecting portion; (B) calculating a second current value based on the target wheel cylinder calculated previously by the pressure calculating portion and on one of the forward mapping dataset and the backward mapping dataset which is presently selected by the first selecting portion; and (C) changing the current value to be supplied to the one of the first to fourth linear valves from the first current value to the second current value.

Moreover, the adjusting portion may perform at the second and following steps in the stepwise current control: (D) calculating a third current value based on a target wheel cylinder calculated presently by the pressure calculating portion and on the one of the forward mapping dataset and the backward mapping dataset which is presently selected by the first selecting portion; and (E) changing the current values to be supplied to the one of the first to fourth linear valves in a series of multiple discrete steps between the second current value and the third current value.

BRIEF DESCRIPTION OF THE DRAWINGS

The invention, together with additional objective, features and advantages thereof, will be best understood from the following description, the appended claims and the accompanying drawings. In the drawings:

FIG. 5 is a schematic diagram showing operating states of portions in the vehicle brake control device in normal braking and in an abnormal situation;

DETAILED DESCRIPTION OF THE EMBODIMENTS

Figure 1:
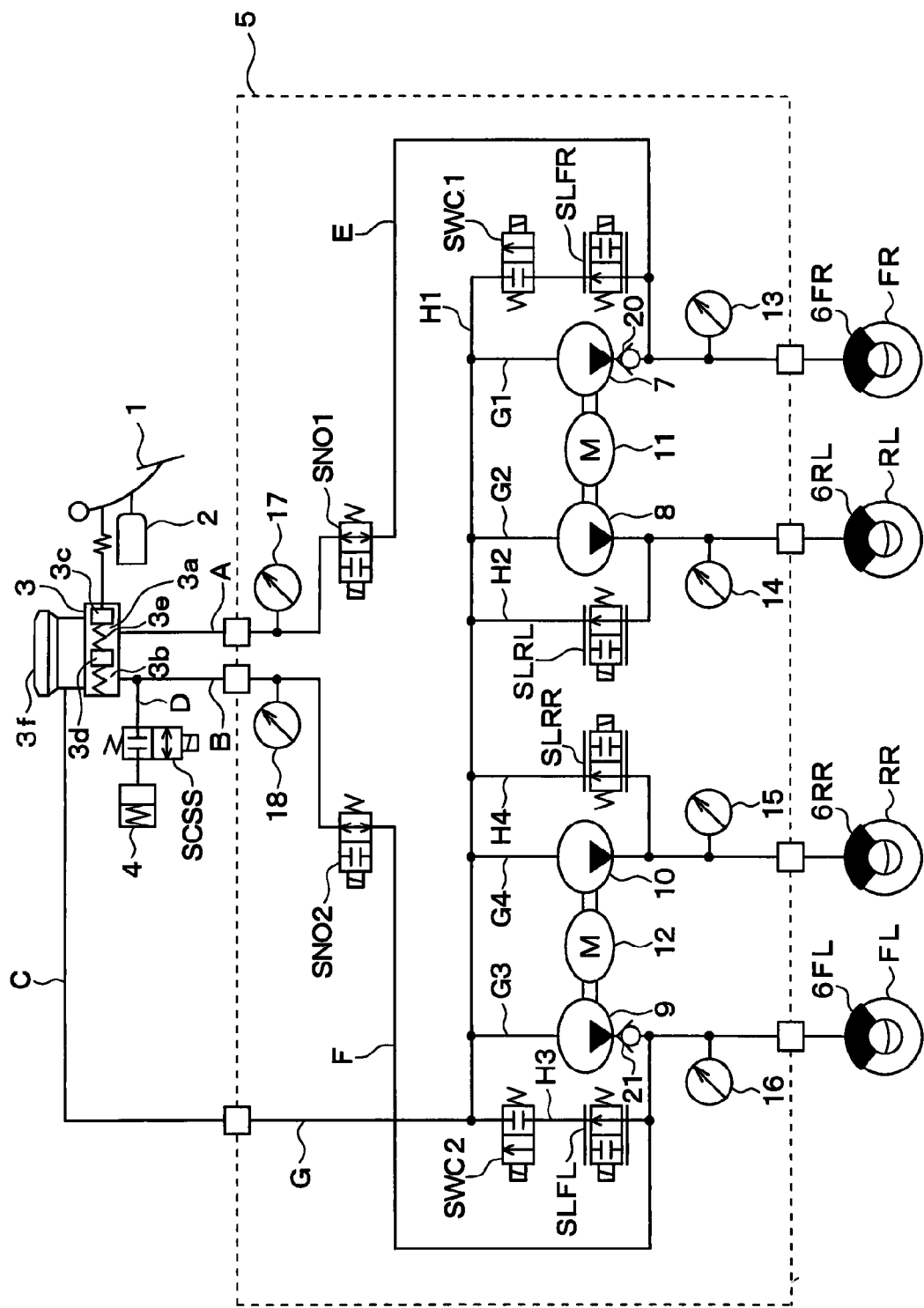
FIG. 1 is a diagram showing a hydraulic circuit configuration of a vehicle brake control device according to the first embodiment of the present invention.

Embodiments of the present invention will be explained below with reference to the drawings. In the embodiments below, identical reference symbols are used in the drawings to represent identical or equivalent elements.

First Embodiment

The vehicle brake control device according to a first embodiment of the present invention is applied to a vehicle with an X-shaped hydraulic circuit including two conduit systems, one of which serves the right front wheel and the left rear wheel and the other of which serves the left front wheel and the right rear wheel.

Figure 2:
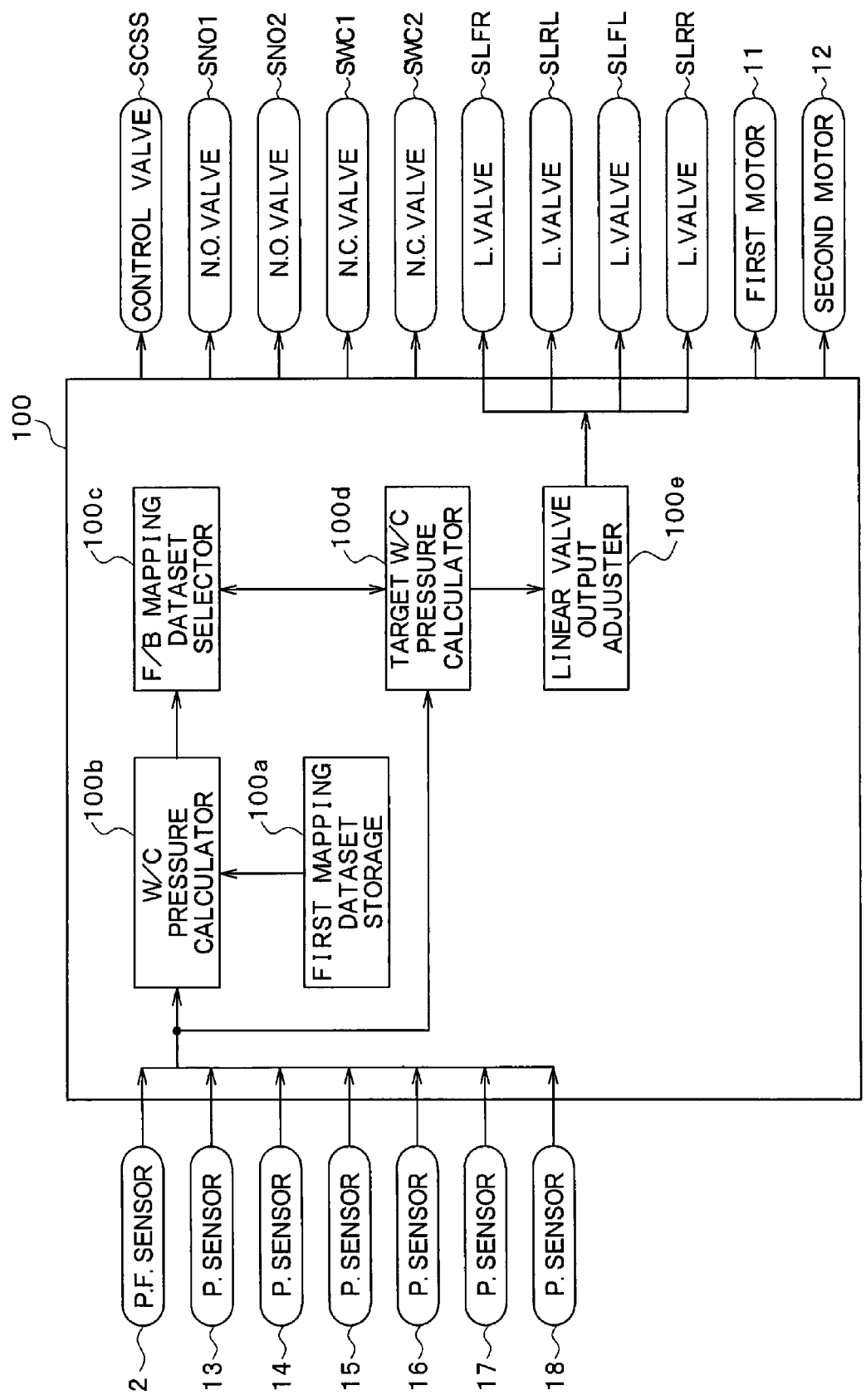
FIG. 2 is a block diagram showing input/output relationships of signals of a brake ECU that controls a control system of the vehicle brake control device shown in FIG. 1.

As shown in FIG. 1, the vehicle brake control device includes a brake pedal 1, a depression force sensor 2, a master cylinder (hereinafter referred to as an M/C) 3, a stroke control valve SCSS, a stroke simulator 4, a brake fluid pressure control actuator 5, and wheel cylinders (hereinafter referred to as W/Cs) 6FL, 6FR, 6RL, 6RR, as well as a brake ECU 100 shown in FIG. 2.

When the brake pedal 1, which is an example of a brake operating member, is depressed by a driver, the depression force applied to the brake pedal 1 is inputted to the depression force sensor 2, and a detection signal corresponding to the applied depression force is outputted by the depression force sensor 2. The detection signal is inputted to the brake ECU 100, and thus the depression force applied to the brake pedal 1 is detected by the brake ECU 100. Although the depression force sensor 2 is used as an example of an operation amount sensor for detecting an operation amount of the brake operating member, a stroke sensor or the like may also be used as another example of the operation amount sensor. The vehicle brake control device may also be configured such that it detects a state of operation of the brake pedal 1 based on the detection signals from a stroke sensor and pressure sensors 17 and 18, which detect an M/C pressure described later.

A push rod or the like is connected with the brake pedal 1 and transmits the applied depression force to the M/C 3. When the push rod or the like is pushed, the M/C pressure is generated in a primary chamber 3a and a secondary chamber 3b, which are provided in the M/C 3.

The M/C 3 includes a primary piston 3c and a secondary piston 3d, which form and demarcate the primary chamber 3a and the secondary chamber 3b. The primary piston 3c and the secondary piston 3d receive an elastic force of a spring 3e, thereby return the brake pedal 1 to its initial position when the brake pedal 1 becomes free from the depression force.

The vehicle brake control device also includes brake conduits A and B, which extend respectively from the primary chamber 3a and the secondary chamber 3b of the M/C 3 to the brake fluid pressure control actuator 5.

The M/C 3 also includes a master reservoir 3f. While the brake pedal 1 is in its initial position, the master reservoir 3f is connected with the primary chamber 3a and the secondary chamber 3b via channels not shown in FIG. 1, supplies brake fluid to the M/C 3, and stores any surplus brake fluid.

A brake conduit C directly extends from the master reservoir 3f to the brake fluid pressure control actuator 5.

The stroke simulator 4 is connected with a brake conduit D extending to the brake conduit B and receives the brake fluid in the secondary chamber 3b. The stroke control valve SCSS, which is a type of normally-closed two-position valve, is provided in the brake conduit D and controls open and closed states of the brake conduit D. A normally closed two-position valve opens a path to which it is installed while electrical power is supplied to it, and closes the path while electrical power is not supplied to it. The configuration allows the stroke control valve SCSS to control the flow of brake fluid to the stroke simulator 4.

The brake fluid pressure control actuator 5 is configured as described below.

The actuator 5 includes a brake conduit E which is connected with the brake conduit A so that the primary chamber 3a is connected via the brake conduit E with the W/C (first front wheel W/C) 6FR, which corresponds to a front wheel FR. A first normally-open valve (a first control valve) SNO1 is located in the brake conduit E. The first normally-open valve SNO1 is a two-position valve that opens a path to which it is installed while electrical power is not supplied to it, and closes the path while electrical power is supplied to it. The first normally-open valve SNO1 controls the open and closed states of the brake conduit E.

The actuator 5 also includes a brake conduit F which is connected with the brake conduit B so that the secondary chamber 3b is connected via the brake conduit F with the W/C (second front wheel W/C) 6FL, which corresponds to a front wheel FL. A second normally-open valve (a second control valve) SNO2 is located in the brake conduit F. The second normally-open valve SNO2 is a two-position valve that opens a path to which it is installed while electrical power is not supplied to it, and closes the path while electrical power is supplied to it. The second normally-open valve SNO2 thus controls the open and closed states of the brake conduit F.

The actuator also includes a brake conduit G which is connected with the brake conduit C that extends from the master reservoir 3f. The brake conduit G branches into four brake conduits called brake conduits G1, G2, G3, and G4 which are respectively connected with the W/Cs 6FR, 6RL, 6FL, and 6RR, wherein the W/Cs 6FL and 6FR respectively correspond to the front wheels FL and FR, and the W/Cs (first and second rear wheel W/Cs) 6RL and 6RR respectively correspond to the rear wheels RL and RR. Note that the brake conduit G includes the brake conduits G1 to G4.

The brake conduits G1 to G4 are respectively provided with pumps (first to fourth pumps) 7, 8, 9, and 10. The pumps 7 to 10 are configured as, for example, trochoid pumps which are effective for quietness. The pumps 7 and 8 are driven by a first motor 11, and the pumps 9 and 10 are driven by a second motor 12. Each of the first motor 11 and the second motor 12 may be of any kind of motor, but a brushless motor is preferable because it increases its rotational speed quickly after it starts rotating.

Brake conduits H1, H2, H3, and H4 are located in parallel with the pumps 7 to 10, respectively.

A first normally-closed valve SWC1 and a first linear valve SLFR are located in series in the brake conduit H1 connected in parallel with the pump 7. The first normally-closed valve SWC1 is located closer than the linear valve SLFR is to the intake side (upstream side) of the pump 7, and the first linear valve SLFR is located closer than the first normally-closed valve SWC1 is to the discharge side (downstream side) of the pump 7. In other words, a return flow returning through the brake conduit H1 to the master reservoir 3f can be controlled by using the first normally-closed valve SWC1.

A second linear valve SLRL is located in the brake conduit H2 connected in parallel with the pump 8.

A second normally-closed valve SWC2 and a third linear valve SLFL are located in series in the brake conduit H3 connected in parallel with the pump 9. The second normally-closed valve SWC2 is located closer than the third linear valve SLFL is to the intake side (upstream side) of the pump 9, and the third linear valve SLFL is located closer than the second normally-closed valve SWC2 is to the discharge side (downstream side) of the pump 9. In other words, a return flow returning through the brake conduit H3 to the master reservoir 3f can be controlled by using the second normally-closed valve SWC2.

A fourth linear valve SLRR is located in the brake conduit H4 connected in parallel with the pump 10.

A first pressure sensor 13, a second pressure sensor 14, a third pressure sensor 16, and a fourth pressure sensor 15 are respectively located in the brake conduits G1 to G4, between the pumps 7 to 10 and the W/Cs 6FR to 6RR, and are configured in such a way that the pressures in each of the W/Cs can be detected. The pressure sensors 17 and 18 are respectively located in the brake conduits E and F on the upstream sides (the M/C 3 sides) of the first and second normally-open valves SNO1; SNO2, and are configured in such a way that an M/C pressure that is generated in the primary chamber 3a and the secondary chamber 3b of the M/C 3 can be detected. The detection signals from the pressure sensors 13 to 18 are inputted to the brake ECU 100, as shown in FIG. 2.

Check valves 20 and 21 are respectively located in the discharge port of the pump 7 which pressurizes the W/C 6FR, and in the discharge port of the pump 9 which pressurizes the W/C 6FL. The check valves 20 and 21 are provided to prevent brake fluid from flowing respectively from the W/Cs 6FR and 6FL to the pumps 7 and 9.

In the vehicle brake control device, a first conduit system includes a hydraulic circuit (a first auxiliary brake conduit) that connects the primary chamber 3a with the W/C 6FR via the brake conduit A and the brake conduit E. The first conduit system also includes a hydraulic circuit (a first main brake conduit) that connects the master reservoir 3f and the W/Cs 6FR and 6RL via the brake conduits C G, G1, and G2. The first conduit system further includes hydraulic circuits (first and second pressure-adjusting brake conduits) having the brake conduits H1 and H2, which are connected in parallel with the pumps 7 and 8, respectively.

Also in the vehicle brake control device, a second conduit system includes a hydraulic circuit (a second auxiliary brake conduit) that connects the secondary chamber 3b and the W/C 6FL via the brake conduit B and the brake conduit F. The second conduit system also includes a hydraulic circuit (a second main brake conduit) that connects the master reservoir 3f and the W/Cs 6FL and 6RR via the brake conduits C, G, G3, and G4. The second conduit system further includes hydraulic circuits (third and fourth pressure-adjusting brake conduits) having the brake conduits H3 and H4, which are connected in parallel with the pumps 9 and 10, respectively.

The brake ECU 100 includes a well-known microcomputer which has a CPU, a ROM, a RAM, and an I/O. The brake ECU 100 executes several kinds of brake control processes according to programs stored in the ROM and the like. The brake ECU 100 includes semiconductor switching elements (not shown) for controlling ON/OFF states of power supply lines for the control valves SCSS, SNO1, SNO2, SWC1, SWC2, SLFR, SLRL, SLFL, SLRR, the first motor 11, and the second motor 12. ON/OFF of the power supply to the valves and the motors and an average of current values for the valves and the motors can be controlled by, for example, using the ON/OFF control of the semiconductor switching elements.

More specifically, the brake ECU 100 includes a first mapping dataset storing portion 100a, a forward/backward W/C pressure calculating portion 100b, a back-and-forth map selecting portion 100c, a target W/C pressure calculating portion 100d, and a linear valve output adjusting portion (hereinafter referred to as an adjusting portion) 100e.

Figure 3:
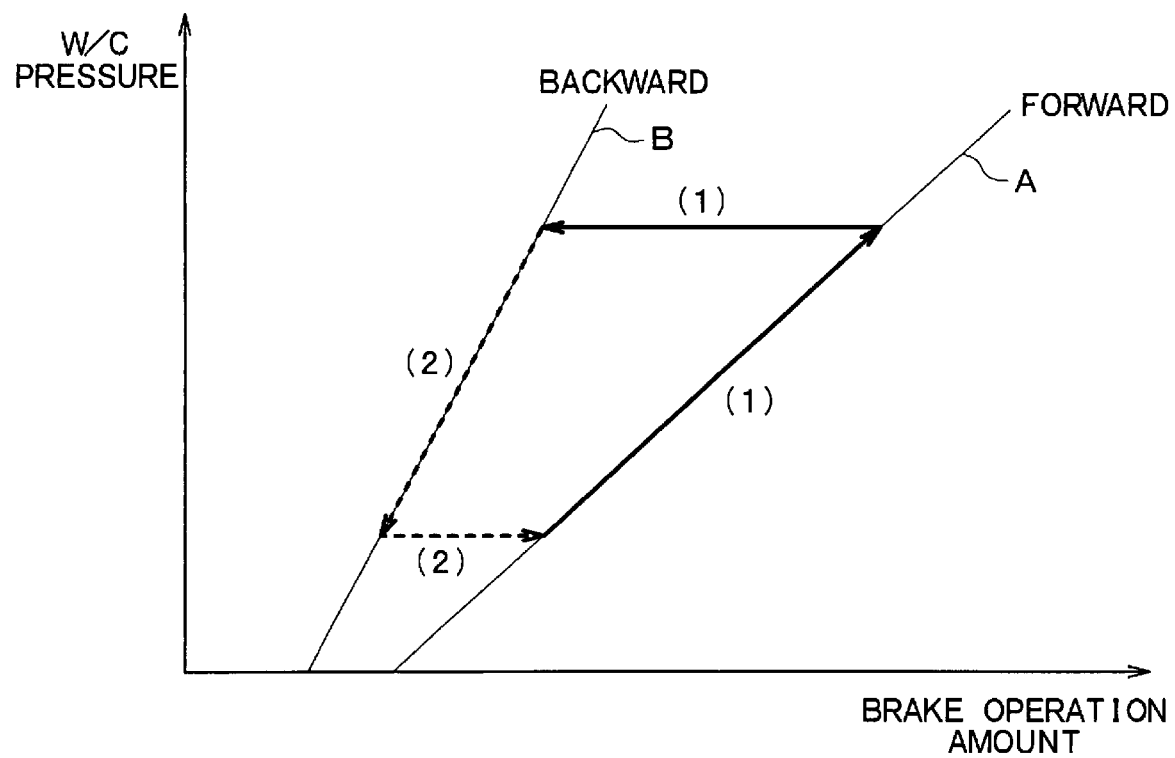
FIG. 3 is a graph showing a forward mapping dataset and a backward mapping dataset.

The first mapping dataset storing portion 100a stores a forward mapping dataset and a backward mapping dataset which depend on an operation of the driver to the brake pedal 1. FIG. 3 is a graph showing both the forward mapping dataset and the backward mapping dataset at the same time. The forward mapping dataset is used in increasing a target WIC pressure while an amount (or degree) of the operation of the brake pedal 1 is increasing. The forward mapping dataset is illustrated in FIG. 3 as a line A. The backward mapping dataset is used in decreasing a target W/C pressure while an amount of the operation of the brake pedal 1 is decreasing. The backward mapping dataset is illustrated in FIG. 3 as a line B.

The forward/backward W/C pressure calculating portion 100b calculates, repeatedly in a predetermined period, W/C pressures (hereinafter referred to as preparation W/C pressures) to be used for selecting one of the forward and backward mapping datasets. More specifically, the forward/backward W/C pressure calculating portion 100b calculates, as one of the preparation W/C pressure, a W/C pressure (hereinafter referred to as a forward W/C pressure) corresponding to the amount of the operation of the brake pedal 1 based on the forward mapping dataset. The forward/backward W/C pressure calculating portion 100b also calculates, as another one of the preparation W/C pressure, a W/C pressure (hereinafter referred to as a backward W/C pressure) corresponding to the amount of the operation of the brake pedal 1 based on the backward mapping dataset. A relation according to the forward mapping dataset between the preparation W/C pressure and the amount of the operation of the brake pedal 1 is indicated by the line A in FIG. 3. A relation according to the backward mapping dataset between the preparation W/C pressure and the amount of the operation of the brake pedal 1 is indicated by the line B in FIG. 3.

The selecting portion 100c selects a mapping dataset for use among the forward mapping dataset and the backward mapping dataset, based on the result of the calculation (more specifically the forward W/C pressure and the backward W/C pressure) of the forward/backward W/C pressure calculating portion 100b and on a target W/C pressure calculated at the second latest timing among periodic calculation timings by the target W/C pressure calculating portion 100d as described later. The latest timing among the periodic calculation timings will be referred to as a present calculation timing. The second latest timing among the periodic calculation timings will also be referred to as a previous calculation timing. The target W/C pressure calculated at the previous calculation timing will also be referred to as a previous output value.

More specifically, the selecting portion 100c stores data as to which one is selected at the previous timing among the forward mapping dataset and the backward mapping dataset. The selecting portion 100c makes a calculation based on the stored selection dataset.

In the case that the forward mapping dataset is selected at the previous calculation timing, the selecting portion 100c compares the forward W/C pressure with the previous output value and selects the larger one of them as a W/C pressure P1, which is an example of a first W/C pressure. The selecting portion 100c selects the backward W/C pressure as a W/C pressure P2, which is an example of a second W/C pressure. The selecting portion 100c then continues selecting the forward mapping dataset as a mapping dataset for use when the W/C pressure P1 is smaller than the W/C pressure P2. In contrast, the selecting portion 100c selects the backward mapping dataset as a mapping dataset for use when the W/C pressure P1 is larger than the W/C pressure P2.

In the case that the backward mapping dataset is selected at the previous calculation timing, the selecting portion 100c selects the forward W/C pressure as the W/C pressure P1. The selecting portion 100c compares the backward W/C pressure with the previous output value and selects the smaller one of them as the W/C pressure P2. The selecting portion 100c then continues selecting the backward mapping dataset as a mapping dataset for use when the W/C pressure P2 is larger than the W/C pressure P1. In contrast, the selecting portion 100c selects the forward mapping dataset as a mapping dataset for use when the W/C pressure P2 is smaller than the W/C pressure P1.

The target W/C pressure calculating portion 100d calculates a target W/C pressure which is necessary in order to generate a target brake force. More specifically, the target W/C pressure calculating portion 100d calculates, based on the detection signal from the depression force sensor 2, a physical quantity representing a depression force corresponding to the amount of the brake operation. Then the target W/C pressure calculating portion 100d calculates the target W/C pressure corresponding to the mapping dataset selected among the forward mapping dataset and the backward mapping dataset by the selecting portion 100c.

The adjusting portion 100e determines, based on the target W/C pressure calculated by the target W/C pressure calculating portion 100d, current values for currents to be supplied to the linear valves SLFR to SLRR. The adjusting portion 100e then adjusts the currents to the linear valves SLFR to SLRR based on the calculated current values. For example, the adjusting portion 100e determines an average of each of the current values in an interval by determining duty factors related to ON/OFF of the currents to the SLFR to SLRR. The adjusting portion 100e controls the averages of the current values by controlling ON/OFF of the semiconductor switching elements located in power supply lines to the first to fourth linear valves SLFR to SLRR, so that differential pressures generated at the first to fourth linear valves SLFR to SLRR have values suitable for the determined target W/C pressure. Each of the differential pressures is a difference in the brake fluid pressure between both ends of its corresponding valve.

In addition to controlling the currents by means of the adjusting portion 100e to the first to fourth linear valves SLFR to SLRR, the brake ECU 100 generates the W/C pressure at each of the W/C 6FR to 6RR by outputting control signals (or control currents) for driving the valves SCSS, SNO1, SNO2, SWC1, SWC2, the first motor 11, and the second motor 12. Then the brake ECU 100 detects the W/C pressure and the M/C pressure based on the detection signals from the pressure sensors 13 to 18 to loop back the actually generated braking force (an actual braking force) to an operation for making the actual braking force closer to a target braking force.

The control signals for driving the valves SCSS, SNO1, SNO2, SWC1, SWC2, SLFR, SLRL, SLFL, SLRR, the first motor 11, and the second motor 12 is supported by power supply from an on-board battery (not shown).

The operation of the brake control device will be explained below separately.

In braking, the first to fourth linear valves SLFR to SLRR are supplied with the currents having the current values determined based on the target W/C pressure calculated by the target W/C pressure calculating portion 100d. The target W/C pressure is calculated based on the selection of the mapping dataset performed by the selecting portion 100c. The vehicle brake control device regularly executes the selection of the mapping dataset by using the selecting portion 100c before and during braking operation.

Figure 4:
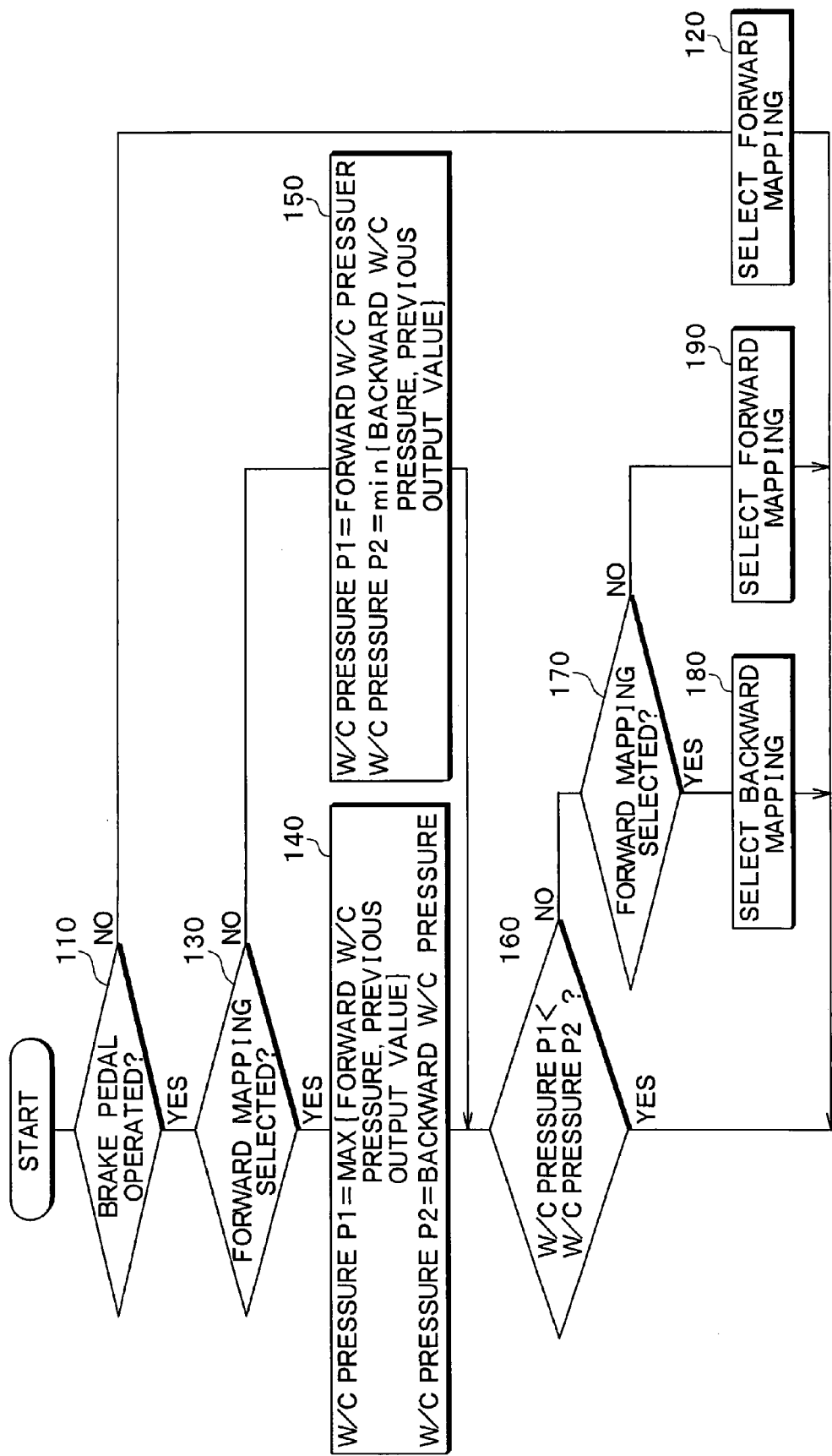
FIG. 4 is a flowchart showing a mapping dataset selection process executed by a back-and-forth map selecting portion.

FIG. 4 is a flowchart showing a process for selecting the mapping dataset. While the ignition switch (not shown) is on, the operations shown in the drawing are regularly executed repeatedly in a predetermined calculation period. The process for selection of the mapping dataset will be described in detail below with reference to the drawing.

At step 110, the selecting portion 100c makes a determination as to whether the driver has operated the brake pedal 1. In an initial state in which the brake pedal 1 has not been operated, that is, in advance of the operation of the brake pedal 1, the process proceeds to step 120 at which the selecting portion 100c selects the forward mapping dataset and terminates executing the process. Therefore, the forward mapping dataset has been selected at the time where the driver starts operating the brake pedal 1.

If the determination at step 110 is affirmative (YES), the process proceeds to step 130 at which the selecting portion 100c makes a determination as to whether the forward mapping dataset has been selected. When the determination at step 130 is affirmative, the process proceeds to step 140 at which the selecting portion 100c compares the previous output value with the forward W/C pressure. The selecting portion 100c also selects at step 140 the larger one of the previous output value and the forward W/C pressure as the W/C pressure P1. The selecting portion 100c further selects, as the W/C pressure P2, at step 140 the backward W/C pressure.

When the determination at step 130 is negative (NO), the process proceeds to step 150 at which the selecting portion 100c selects, as the W/C pressure P1, the forward W/C pressure. The selecting portion 100c also compares at step 150 the previous output value with the backward W/C pressure. The selecting portion 100c selects at step 150 the smaller one of the backward W/C pressure and the previous output value as the W/C pressure P2.

Subsequently to step 140 or 150, the process proceeds to step 160 at which the selecting portion 100c makes a determination as to whether the W/C pressure P1 is smaller than the W/C pressure P2. When the determination at step 160 is affirmative, the selecting portion 100c continues selecting the currently selected mapping dataset as the mapping dataset for use. When the determination at step 160 is negative, the process proceeds to step 170 at which the selecting portion 100c makes a determination as to whether the forward mapping dataset is selected. When the determination at step 170 is affirmative, the process proceeds to step 180 at which the selecting portion 100c changes a mapping dataset for selection to the backward mapping dataset. When the determination at step 170 is negative, the process proceeds to step 190 at which the selecting portion 100c switches a mapping dataset for selection to the forward mapping dataset.

In other words, in the case that the forward mapping dataset has been selected, the selecting portion 100c continues selecting the forward mapping dataset when the W/C pressure P1 is smaller than the W/C pressure P2, and selects the backward mapping dataset when the W/C pressure P1 exceeds the W/C pressure P2. In the case that the backward mapping dataset has been selected, the selecting portion 100c continues selecting the backward mapping dataset when the W/C pressure P2 is larger than the W/C pressure P1, and selects the forward mapping dataset when the W/C pressure P2 decreases below the W/C pressure P1.

The mapping dataset are selected in the manner described above. The target W/C pressure calculating portion 100d accordingly determines, based on the selected mapping dataset and the amount of operation of the brake pedal 1, the current values of the currents for supplying to the first to fourth linear valves SLFR to SLRR.

The operation of the brake control device during normal braking and in an abnormal situation will be explained below separately.

FIG. 5 is a table showing the operating states of portions of the vehicle brake control device during the normal braking and in the abnormal situation. The brake ECU 100 determines, by executing a conventional initial check or the like, whether or not the abnormal situation has arose. If the abnormal situation arises, abnormal-state braking operation is executed until the abnormal situation goes away. Hereinafter, the operation during the normal braking, in ABS operation, and in the abnormal situation will be explained with reference to FIG. 5.

(1) Operation During the Normal Braking

During normal braking, when the brake pedal 1 is depressed and the detection signal from the brake operation amount sensor 2 is inputted to the brake ECU 100, the brake ECU 100 operates the various control valves SCSS, SNO1, SNO2, SWC1, SWC2, SLFR, SLRL, SLFL, SLRR, and the first and second motors 11, 12 such that they are in the operating states shown in FIG. 5.

Electric power to both the first and second normally-open valves SNO1 and SNO2 is turned to ON, and electric power to both the first and second normally-closed valves SWC1 and SWC2 is turned to ON. Therefore, the first and second normally-open valves SNO1 and SNO2 are both put into a closed state, and the first and second normally-closed valves SWC1 and SWC2 are both put into an open state.

The ON/OFF switching of electric power to the first to fourth linear valves SLFR, SLRL, SLFL, SLRR is subject to duty control (or PWM control) under which the amount of electric power supplied per unit time to the linear valves is controlled in such a way that the pressure differences between the upstream and downstream sides of the linear valves are controlled linearly. At this time, the current values of the currents for supplying to the first to fourth liner valves SLFR to SLRR are determined based on the selected mapping dataset.

Electric power to the stroke control valve SCSS is turned to ON, causing the stroke simulator 4 to be connected with the secondary chamber 3*b* through the brake conduits B and D. In this case, the brake fluid in the secondary chamber 3*b* moves to the stroke simulator 4 when the brake pedal is depressed and the pistons 3*c* and 3*d* move. Therefore, when the driver depresses the pedal 1, a reaction force corresponding to an amount of the depression is generated. The brake pedal 1 can hence be depressed without making the driver feel that depressing the brake pedal 1 becomes like pressing a hard board (i.e. giving a board feeling) as a result of the increase in the master cylinder pressure.

In addition, power supply to the first and second motors 11 and 12 is turned to ON and the pumps 7 to 10 draws in and discharges the brake fluid. In this manner, the brake fluid is supplied to the W/Cs 6FR to 6RR when the pumps 7 to 10 perform pumping operation.

Since the first and second normally-open valves SNO1 and SNO2 are in a closed state at this time, the brake fluid pressures downstream of the pumps 7 to 10, that is, the W/C pressures of the W/Cs 6FR to 6RR, are increased. Since the first and second normally-closed valves SWC1 and SWC2 are in an open state and the average amount of electric energy supplied per unit time to the first to fourth linear valves SLFR, SLRL, SLFL, and SLRR are subject to duty control, the W/C pressures of the W/Cs 6FR to 6RR are adjusted according to duty factors of the current value for the linear valves SLFR, SLRL, SLFL, and SLRR.

The brake ECU 100 monitors the W/C pressures in the W/Cs 6FR to 6RR based on the detection signals from the pressure sensors 13 to 16. The brake ECU 100 accordingly adjusts the W/C pressures to desired values by adjusting the amounts of electric power supplied to the first and second motors 11 and 12 to control the revolution speeds thereof and by controlling the ON/OFF duty ratios for the electric power that is supplied to the first to fourth linear valves SLFR, SLRL, SLFL, and SLRR.

Thus, braking force is generated according to the amount of operation performed to the brake pedal 1.

(2) Abnormal-State Braking Operation

When an abnormal situation arises in the vehicle brake control device, there is a possibility that control signals cannot be outputted from the brake ECU 100, or that some of the control valves SCSS, SNO1, SNO2, SWC1, SWC2, SLFR, SLRL, SLFL, SLRR or the first and second motors 11, 12 do not work properly. In this case, electric power to the various control valves SCSS, SNO1, SNO2, SWC1, SWC2, SLFR, SLRL, SLFL, SLRR and the first and second motors 11, 12 is turned to OFF as shown in FIG. 5.

Since the electric power to both the first and second normally-open valves SNO1 and SNO2 is turned to OFF, both valves SNO1 and SNO2 are in the open states. Since the electric power to both the first and second normally-closed valves SWC1 and SWC2 is turned to OFF, both valves SWC1 and SWC2 are in the closed states.

Since the electric power to all of the first to fourth linear valves SLFR, SLRL, SLFL, and SLRR is turned to OFF, they are in the open states. Since electric power to the stroke control valve SCSS is also turned to OFF, the stroke simulator 4 and the secondary chamber 3*b* are cut off from each other.

Since the electric power to the first and second motors 11 and 12 is turned to OFF, the pumps 7 to 10 stop drawing in and discharging the brake fluid.

At this time, the primary chamber 3*a* of the M/C 3 is in a state in which it is connected with the W/C 6FR in the right front wheel FR via the brake conduits A, E, and G1, and the secondary chamber 3*b* is in a state in which it is connected with the W/C 6FL in the left front wheel FL via the brake conduits B, F, and G3.

Therefore, if the brake pedal 1 is depressed and the push rod or the like is pushed according to the applied depression force, the M/C pressure is generated in the primary chamber 3*a* and the secondary chamber 3*b* and the M/C pressure is transmitted to the W/Cs 6FR and 6FL. Braking force is thereby generated for both front wheels FR and FL.

In the abnormal-state braking operation described above, the W/C pressures in the W/Cs 6FR and 6FL on the front wheels also takes effect in the brake conduits G1 and G3. However, the check valves 20 and 21 prevent the W/C pressures from bearing on the pumps 7 and 9 and thereby prevent the brake fluid leaking through the pumps 7 and 9. The W/C pressures therefore are not decreased because of leaking of the brake fluid.

As described above, in the vehicle brake control device of the present embodiment, the target W/C pressure depending on the amount of operation performed to the brake pedal 1, exhibits hysteresis due to the forward mapping dataset and the backward mapping dataset. The vehicle brake control device selects the forward mapping dataset or the backward mapping dataset based on the amount of operation performed to the brake pedal 1, and determines the current values of the currents to be supplied to the first to fourth linear valves SLFR to SLRR.

Therefore, it is possible to prevent the W/C pressure from changing too sensitively to the operation to the brake pedal 1 and from changing even when the driver is not intentionally operating the brake pedal 1. This makes the driver experience an improved brake feeling.

Second Embodiment

Hereinafter, a second embodiment of the present invention will be described. The present embodiment differs from the first embodiment in that the current-values to be supplied to the first to fourth linear valves SLFR to SLRR are determined so that they reflect a mechanical relation between the currents to the first to fourth linear valves SLFR to SLRR and the differential pressures generated at the first to fourth linear valves SLFR to SLRR.

Figure 6:
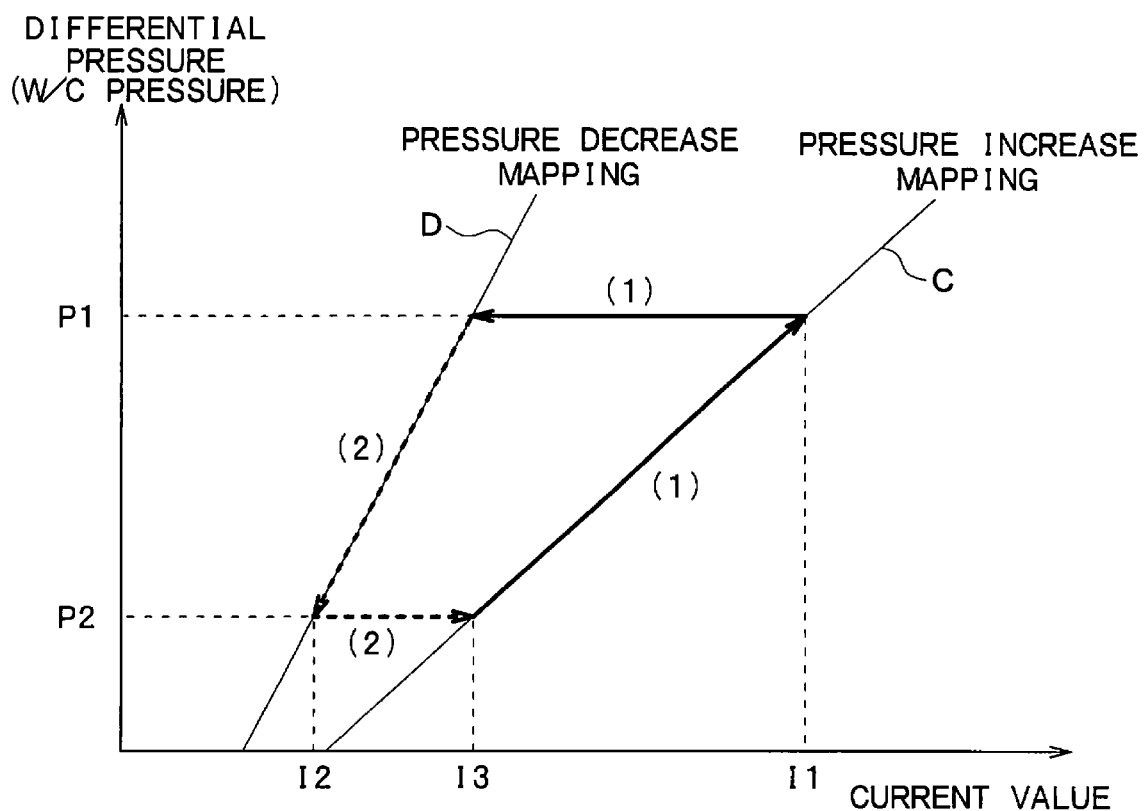
FIG. 6 is a graph showing a relation between a current value and a differential pressure in first to fourth linear valves.

The differential pressures generated at the first to fourth linear valves SLFR to SLRR change depending on the current values of the current to the first to fourth linear valves SLFR to SLRR, respectively. Therefore, the current values for the first to fourth linear valves SLFR to SLRR are adjusted in order to generate the differential pressures which correspond to determined target W/C pressures. More specifically, the target W/C pressures are identical with the differential pressures. The mechanical relation between the current values and the differential pressures at the first to fourth linear valves SLFR to SLRR exhibits hysteresis as shown in FIG. 6. Therefore, the current values to the first to fourth linear valves SLFR to SLRR required to generate a W/C pressure in a first process are different from those in a second process, wherein the first process is a process in which the differential pressure increases as illustrated by lines (1) in FIG. 6 and the second process is a process in which the differential pressure decreases as illustrated by lines (2) in FIG. 6.

For example, as shown in FIG. 6, in order to decrease a target W/C pressure from a pressure P1 to another pressure P2, the current values to the first to fourth linear valves SLFR to SLRR need to be decreased from a current value I1 to another current value I2. If the brake ECU 100 had no mapping dataset indicating a relation between the differential pressure and the current value other than the mapping dataset indicated by a line C, the brake ECU 100 would try to decrease the differential pressure from P1 to P2 by decreasing the current value from the current value I1 to another current value I3, which cannot in fact decrease the W/C pressures at the first to fourth linear valves SLFR to SLRR.

The brake ECU 100 of the present embodiment determines the current values to be supplied to the first to fourth linear valves SLFR to SLRR based on the target W/C pressures calculated by the target W/C pressure calculating portion 100d and on mapping datasets each indicating a relation between the differential pressure and the current value which are shown in FIG. 6. Mapping datasets each indicating a relation between the differential pressure and a current value will be referred to as the current-pressure mapping dataset.

Figure 7:
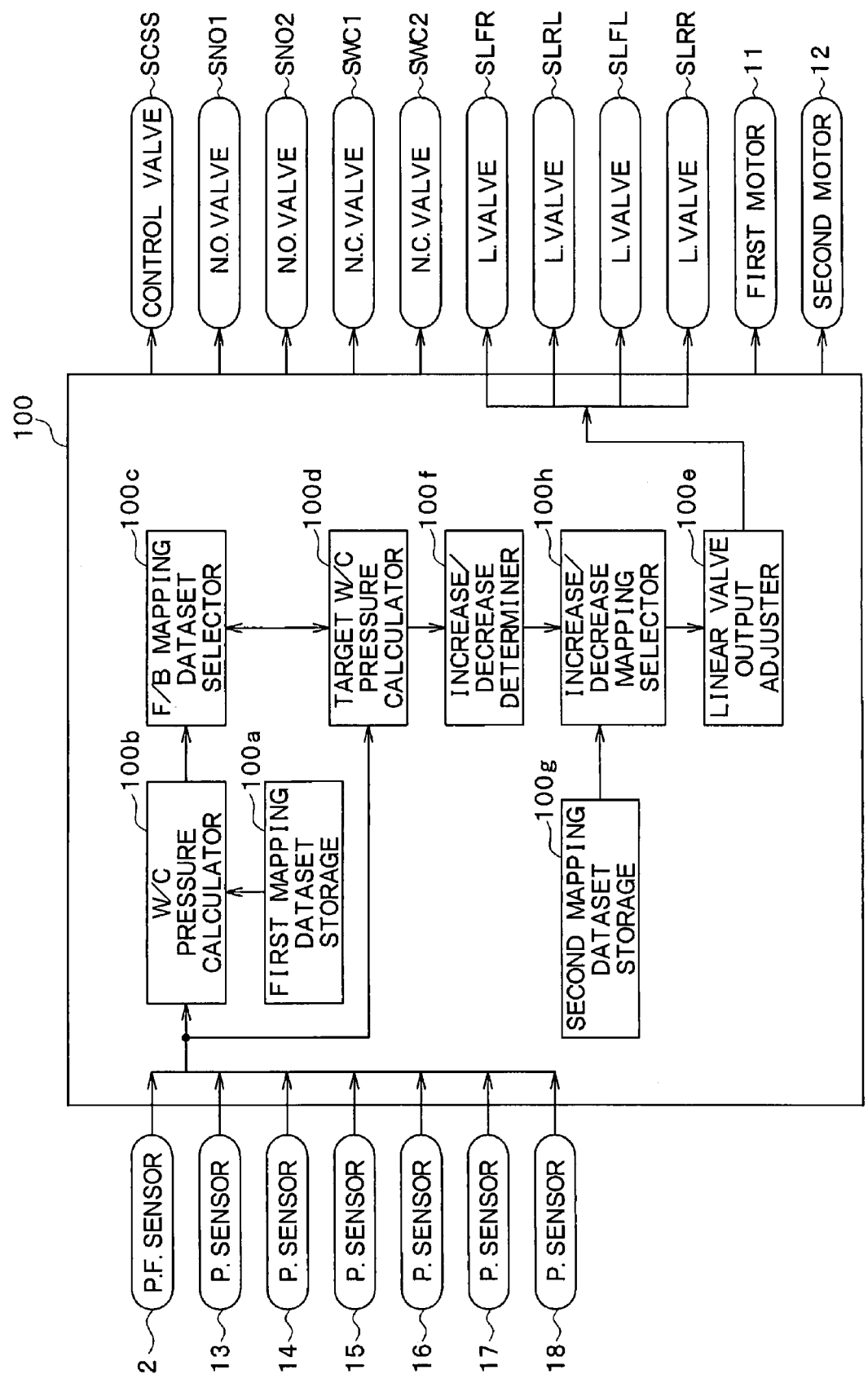
FIG. 7 is a block diagram showing input/output relationships of signals of a brake ECU that controls a control system of the vehicle brake control device according to the second embodiment of the present invention.

FIG. 7 shows an input/output structure of the brake ECU 100 which controls the control system of the vehicle brake control device according to the present embodiment. The vehicle brake control device of the present embodiment differs from that of the first embodiment in the structure of the brake ECU 100. Hereinafter, the difference of the present embodiment from the first embodiment will be described in detail.

As shown in FIG. 7, the brake ECU 100 of the present embodiment includes an increase/decrease pressure determination portion 100f, a second mapping dataset storing portion 100g, and an increase/decrease pressure mapping dataset selecting portion (hereinafter referred to as a second selecting portion) 100h, as well as the portions 100a to 100e described in the first embodiment.

The increase/decrease pressure determination portion 100f determines whether a target W/C pressures is in an increasing process in which it increases or in a decreasing process in which it decreases. The determination is executed based on one of the target W/C pressures calculated by the target W/C pressure calculating portion 100d. More specifically, the increase/decrease pressure determination portion 100f compares the target W/C pressure calculated by the target W/C pressure calculating portion 100d at the previous calculation timing with the target W/C pressure calculated at the present calculation timing, determines that the target pressure is in the increasing process when the target W/C pressure at the present calculation timing is larger than that at the previous calculation timing, and determines that the target pressure is in the decreasing process when the target W/C pressure at the present calculation timing is smaller than that at the previous calculation timing.

The second mapping dataset storing portion 100g stores mapping datasets shown in FIG. 6 indicating dependency of the current value to the first to fourth linear valves SLFR to SLRR on the target W/C pressure, that is, on differential pressure at the first to fourth linear valves SLFR to SLRR. One of the mapping datasets illustrated in FIG. 6 as the line C are the mapping dataset for the increasing process, and the other one illustrated in FIG. 6 as the line D are the mapping dataset for the decreasing process. The mapping datasets for the increasing process and the decreasing process are referred to as an increasing mapping dataset and a decreasing mapping dataset, respectively. The increasing mapping dataset indicates dependency of the current value on the target W/C pressure changing in the increasing process. The decreasing mapping dataset indicates dependency of the current value on the target W/C pressure changing in the decreasing process.

The second selecting portion 100h selects one of the increasing mapping dataset and the decreasing mapping dataset based on the mapping datasets in the second mapping dataset storing portion 100g and on the result of the determination of the increase/decrease pressure determination portion 100f.

With these additional portions of the vehicle brake control device, the adjusting portion 100e determines the current values to the first to fourth linear valves SLFR to SLRR based on the result of the selection of the second selecting portion 100h and the target W/C pressure calculated by the target W/C pressure calculating portion 100d.

Hereinafter, the detailed method for determining the current values to the first to fourth linear valves SLFR to SLRR will be described.

The increase/decrease pressure determination portion 100f calculates a difference between the W/C pressures calculated by the target W/C pressure calculation portion 100d at the present calculation timing and the previous calculation timing and determines whether the calculated difference has a positive value or a negative value. When the difference has a positive value, it is determined that the W/C pressure is in the increasing process. When the difference has a negative value, it is determined that the W/C pressure is in the decreasing process. When the difference has zero value, the mapping dataset which was selected at the previous calculation timing is selected again.

The second selecting portion 100h then selects the increasing mapping dataset illustrated in FIG. 6 as the line C when it is determined that the W/C pressure is in the increasing process. The second selecting portion 100h selects the decreasing mapping dataset illustrated in FIG. 6 as the line D when it is determined that the W/C pressure is in the decreasing process. A current value corresponding to the target W/C pressure is then calculated by using a selected one of the increasing mapping dataset and the decreasing mapping dataset. For example, when the target W/C pressures at the previous calculation timing and the present calculation timing respectively have the values P1 and P2 shown in FIG. 6, the current value is calculated at the present calculation timing to have the value I2 based on the decreasing mapping dataset. In contrast, when the target W/C pressures at the previous calculation timing and the present calculation timing respectively have the values P2 and P1 shown in FIG. 6, the current value is calculated at the present calculation timing to have the value I1 based on the decreasing mapping dataset.

As described above, the vehicle brake control device of the present embodiment determines the current values of the currents to be supplied to the first to fourth linear valves SLFR to SLRR by means of the target W/C pressure calculated by the target W/C pressure calculating portion 100d and the current-pressure mapping datasets shown in FIG. 6. Consequently, the determined current values reflect characteristics of the first to fourth linear valves SLFR to SLRR.

It is therefore possible to determine the current values for the first to fourth linear valves SLFR to SLRR based on whether the target W/C pressure is increasing or decreasing. As a result, it is possible to avoid a problem in which the differential pressures and the generated W/C pressures do not change even if the current values for the first to fourth linear valves SLFR to SLRR change based on the increase or decrease of the target W/C pressure.

Third Embodiment

Hereinafter, a third embodiment of the present invention will be described. In the second embodiment, the current value for the first to fourth linear valves SLFR to SLRR is properly adjusted in accordance with increase or decrease of the target W/C pressure. However, when the current value changes quickly by a large amount such as from the current value I1 to the current value I2 shown in FIG. 6, the driver may experience an uncomfortable feeling that the generated W/C pressure jumps up or down quickly. The vehicle brake control device of the present embodiment is aimed for preventing the uncomfortable feeling from occurring. The vehicle brake control device of the present embodiment differs from that of the second embodiment in the process executed by the adjusting portion 100e. The difference of the present embodiment from the second embodiment will be described in detail.

The brake ECU 100 of the present embodiment differs from that of the second embodiment in that the brake ECU 100 detects a time instant at which the target W/C pressure transits between the decreasing process and the increasing process. The brake ECU 100 then changes the current value in a stepwise manner at the detected transition time instant in order to cope with a great amount of change in the current value for the first to fourth linear valves SLFR to SLRR. The adjusting portion 100e executes a process for changing the current value in the stepwise manner.

Figure 8:
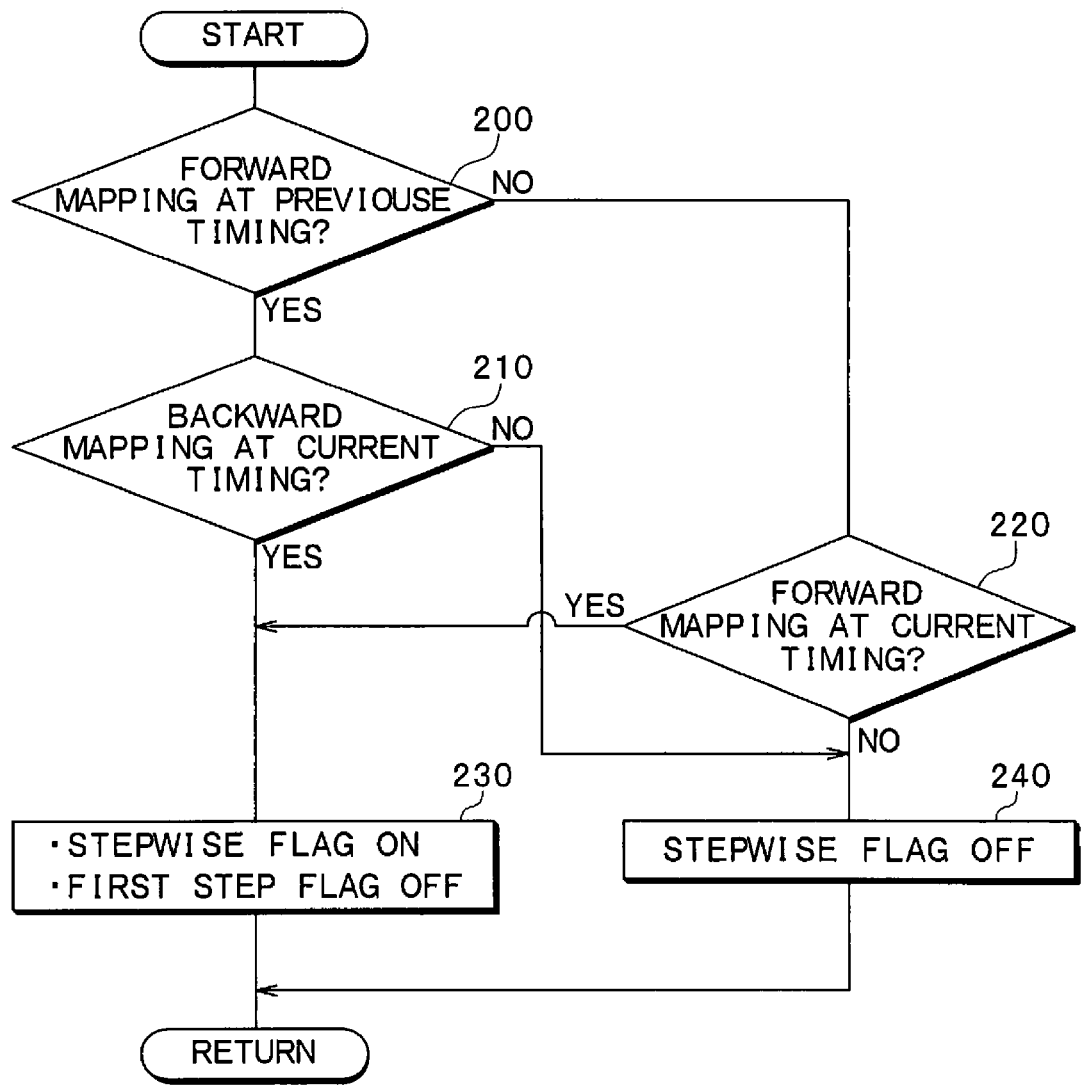
FIG. 8 is a flowchart showing a stepwise current control determination process.
Figure 9A:
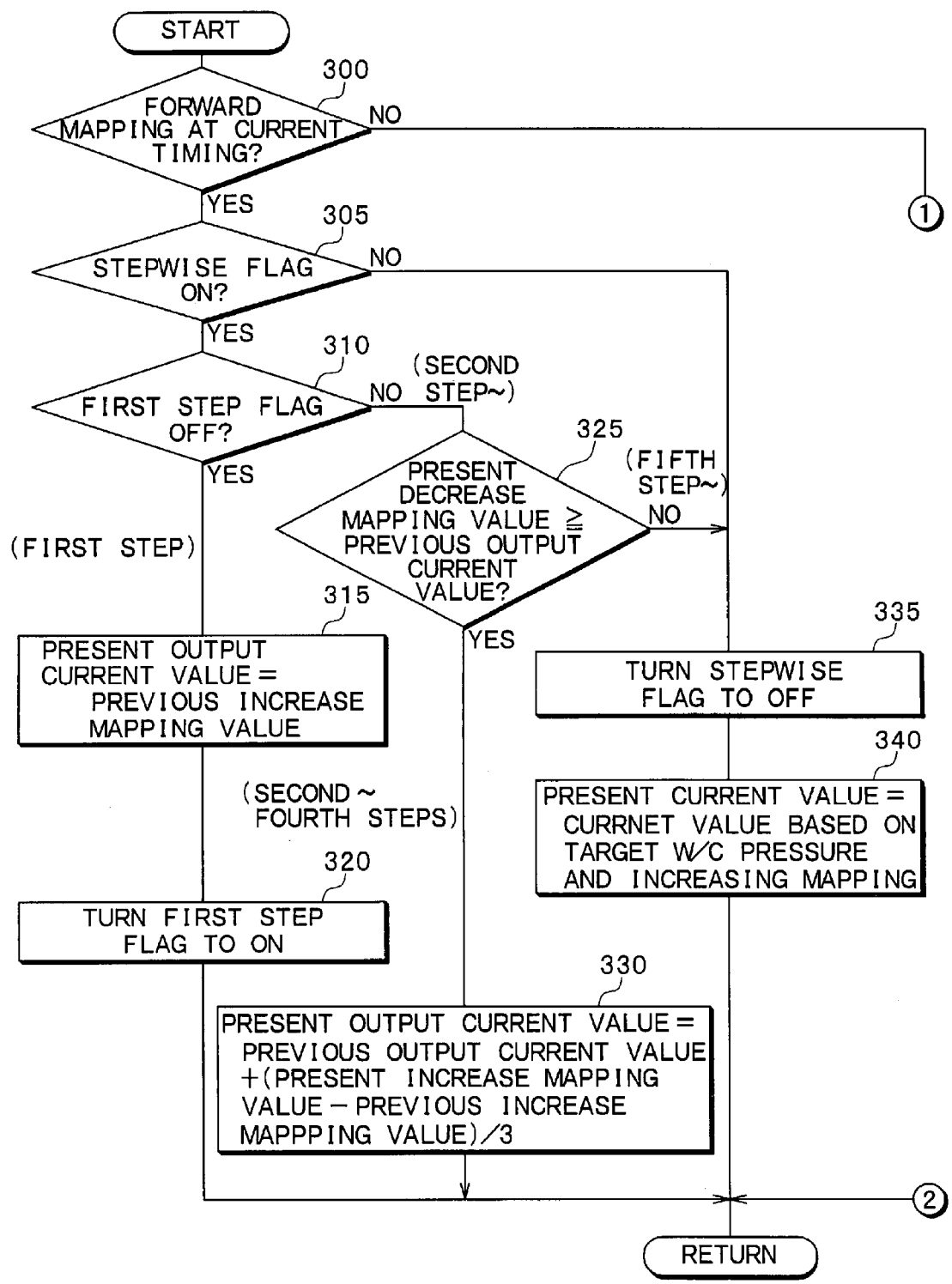
FIG. 9A is a flowchart showing a part of an output current value calculation process for changing a current value for the first to fourth linear valves in a stepwise manner.
Figure 9B:
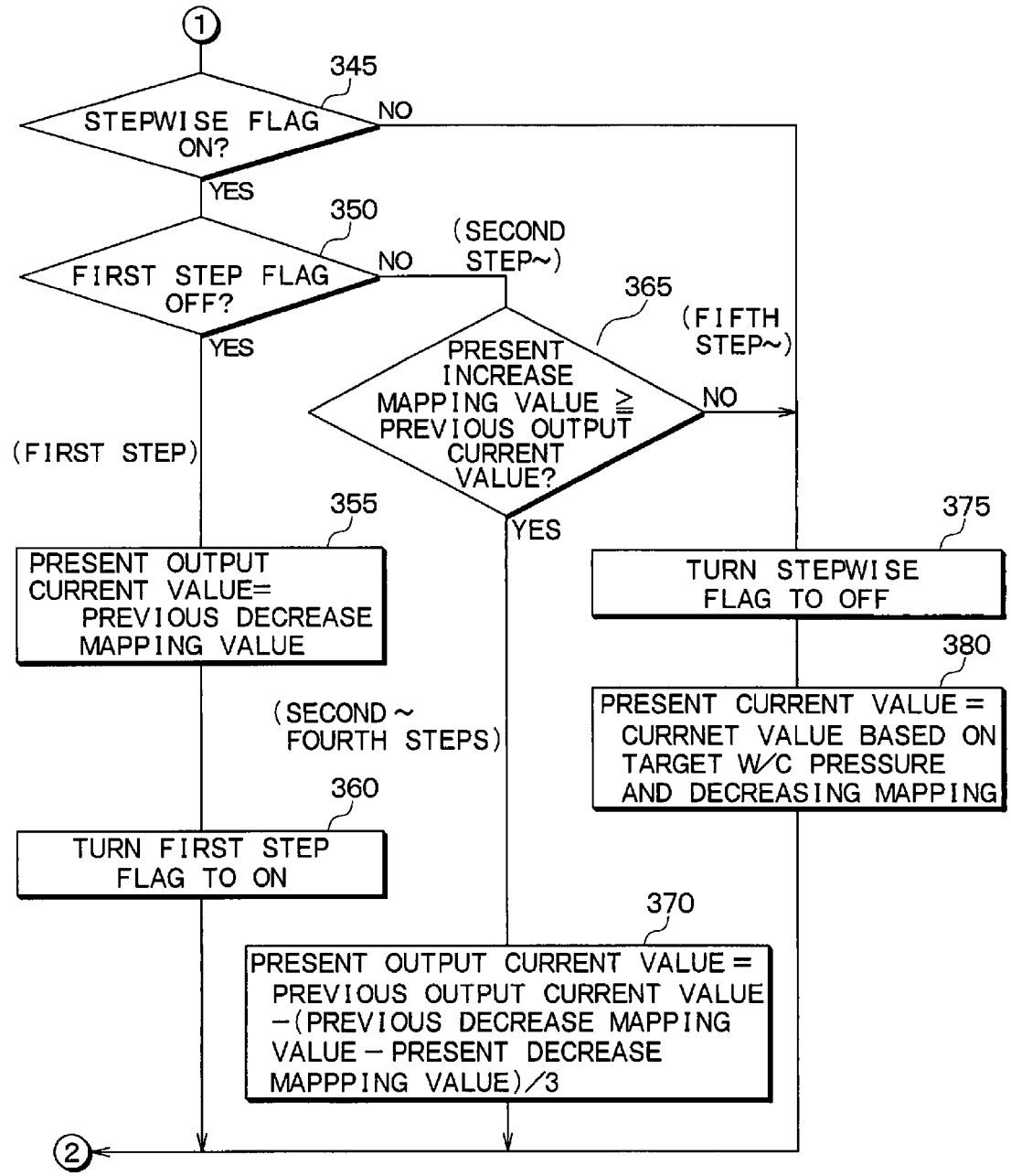
FIG. 9B is a flowchart showing the other part of the output current value calculation process.

FIGS. 8, 9A, and 9B show processes executed by the adjusting portion 100e. More specifically, FIG. 8 is a flowchart showing a stepwise current control determination process for determining whether a stepwise current control is to be executed in which the current value for the first to fourth linear valves SLFR to SLRR are changed in a stepwise manner. FIGS. 9A and 9B are flowcharts showing output current value calculation process. The stepwise current control determination process shown in FIG. 8 is executed at periodic calculation timings, the interval of which is the same as that of the process for selecting the mapping dataset shown in FIG. 4. The output current value calculation process shown in FIGS. 9A and 9B is executed at periodic calculation timings, the interval of which is as short as one fourth of the interval for the process for selecting the mapping dataset shown in FIG. 4. The processes executed by the adjusting portion 100e will be described with reference to the drawings.

After selecting, as described in the second embodiment, one of the increasing mapping dataset and the decreasing mapping dataset as a mapping dataset for use, the adjusting portion 100e determines in steps 200 to 220 in FIG. 8 whether the selection of the forward and backward mapping datasets has changed due to the change of the selection from the forward mapping dataset at the previous calculation timing to the backward mapping dataset at the present calculation timing or due to the change of the selection from the backward mapping dataset at the previous calculation timing to the forward mapping dataset at the present calculation timing. More specifically, the adjusting portion 100e makes a determination at step 200 as to whether the forward mapping dataset is selected at the previous calculation timing. If the determination is affirmative (YES), the adjusting portion 100e makes a determination at step 210 as to whether the backward mapping dataset is selected at the present calculation timing. If the determination is negative (NO), the adjusting portion 100e makes a determination at step 220 as to whether the forward mapping dataset is selected at the present calculation timing.

If the selection of the mapping dataset has changed, in other words, if the determination at step 210 or 220 is affirmative, the process proceeds to step 230. If the selection of the mapping dataset has not changed, in other words, if the determination at step 210 or 220 is negative, the process proceeds to step 240.

At step 230, the adjusting portion 100e sets a stepwise current control flag (hereinafter referred to as a stepwise flag) to ON and sets a first step current output completion flag (hereinafter referred to as a first step flag) to OFF in order to cope with a large amount of change in the current value for the first to fourth linear valves SLFR to SLRR. The stepwise flag is a flag indicating whether or not to control the change of the current value in a stepwise manner. The adjusting portion 100e starts controlling the change of the current value in a stepwise manner when the stepwise flag is turned to ON. The first step flag is a flag which is used to determine whether the adjusting portion 100e has completed outputting of the current value of the first step in the stepwise control. The adjusting portion 100e determines that outputting of the current value of the first step has not been completed yet when the first step flag is turned to OFF.

At step 240 at which it is supposed that the selected mapping dataset has not been changed and the current value does not change by a large amount, the adjusting portion 100e turns the stepwise flag to OFF and ends the stepwise current control determination process.

In the output current value calculation process shown in FIGS. 9A and 9B, the adjusting portion 100e controls, based on the result of the determination made in the stepwise current control determination process, the change of the current value in a stepwise manner.

Figure 10A:
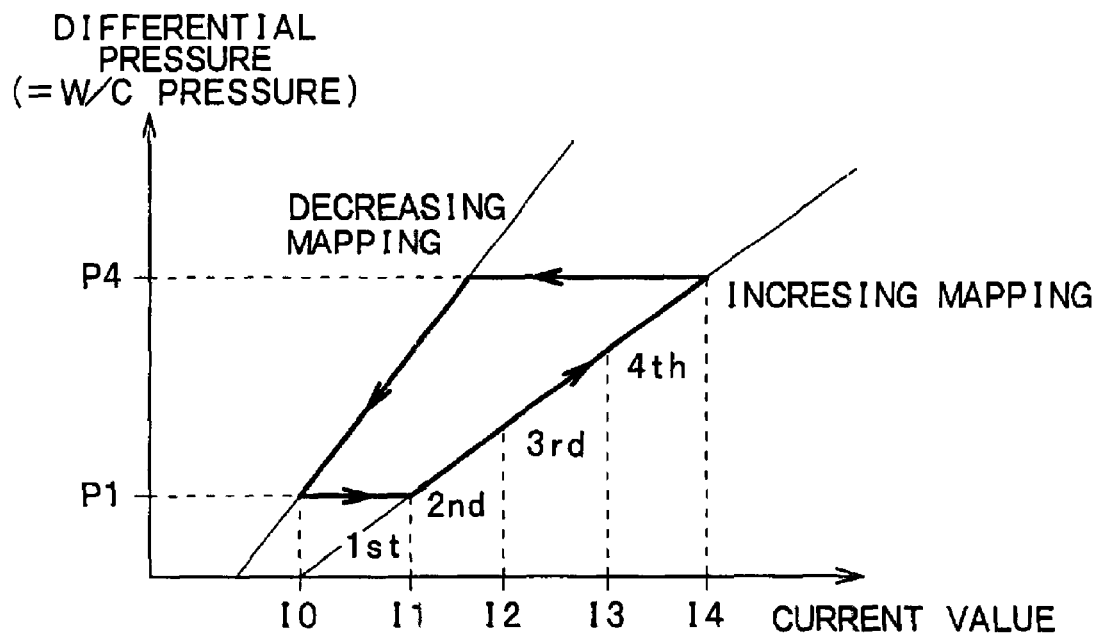
FIG. 10A is a schematic diagram showing a method for changing the current value in the case that a target W/C pressure transits from a decreasing process to an increasing process.
Figure 10B:
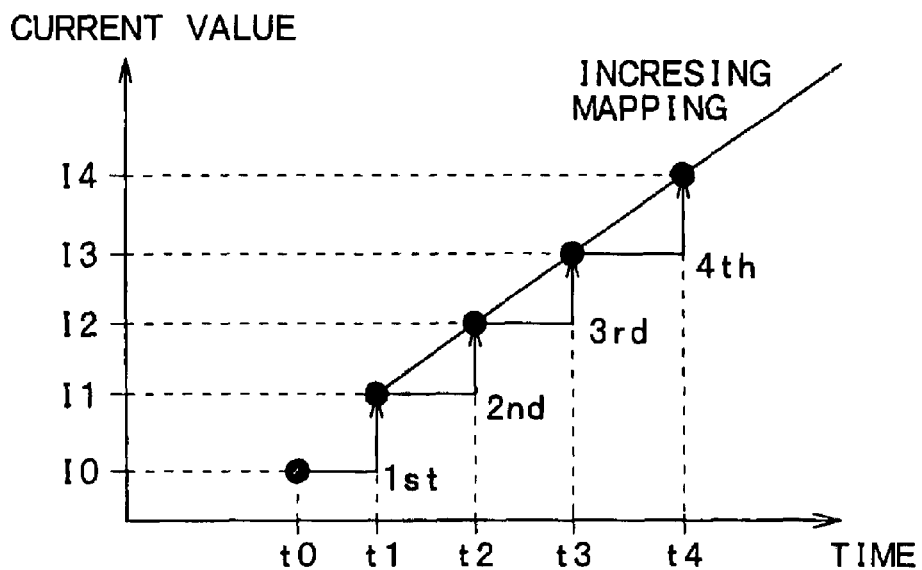
FIG. 10B is a schematic diagram showing a change of the current value against time.

The output current value calculation process is described with reference to FIGS. 10A and 10B. FIG. 10A is a schematic diagram showing the change of the current value in the case that the backward mapping dataset is selected at the previous calculation timing and the forward mapping dataset is selected at the present calculation timing, that is, in the case that the target W/C pressure has transited from the decreasing process to the increasing process. FIG. 10B is a schematic diagram showing the change of the current value against time.

The current value depending on the target W/C pressure is calculated based on the decreasing mapping dataset before the target W/C pressure transits from the decreasing process to the increasing process. Right after the target W/C pressure transits from the decreasing process to the increasing process, the current value depending on the target W/C pressure is calculated based on the increasing mapping dataset. Suppose in this case that the target W/C pressure increases from the value P1 to the value P4 in FIG. 10A. The current value then changes by a large amount from the value I0 on the decreasing mapping dataset to the value I4 on the increasing mapping data. The adjusting portion 100e of the present embodiment changes the current value in four steps.

First, the current value for the first step is calculated as a current value corresponding to the target W/C pressure at the previous calculation timing according to the increasing mapping dataset. The current values for the second to fourth steps are calculated based on the increasing mapping dataset by using the W/C pressures changing in three steps from the target W/C pressure at the previous calculation timing and the target W/C pressure at the present calculation timing.

Thus, as shown in FIG. 10A, the calculated current value gradually changes in time, which prevents the driver from experiencing an uncomfortable brake feeling that the generated W/C pressure suddenly jumps up or down. As described above, the output current value calculation process shown in FIGS. 9A and 9B is executed at periodic calculation timings, the interval of which is as short as one fourth of the interval for the calculation timings of the stepwise current control determination process shown in FIG. 8. The adjusting portion 100e can therefore complete the overall process for changing the current value in the stepwise manner in an interval between the periodical calculation timings for the stepwise current control determination process.

Hereinafter, a detailed description will be given for the output current value calculation process. The adjusting portion 100e makes a determination at step 300 as to whether the forward mapping dataset is selected at the present calculation timing. If the determination is affirmative, the process proceeds to step 305. If the determination is negative, the process proceeds to step 345.

At step 305, the adjusting portion 100e makes a determination as to whether the stepwise flag is ON. The determination at step 305 becomes affirmative if the stepwise flag has been turned to ON at step 230 shown in FIG. 8. The determination at step 305 becomes negative if the stepwise flag has been turned to OFF at step 240. Depending on that the determination at step 305 is affirmative or negative, the process proceeds to step 310 or 335, respectively.

At step 310, the adjusting portion 100e makes a determination as to whether the first step flag has been turned to OFF. The determination at step 310 becomes affirmative if the first step flag was turned to OFF at step 230 shown in FIG. 8. The determination at step 310 becomes affirmative if the first step flag was turned to ON at step 320 described later. If the determination at step 310 is affirmative, the process proceeds to step 315. Depending on that the determination at step 310 is affirmative or negative, the process proceeds to step 315 or 325, respectively.

At step 315, the adjusting portion 100e calculates the current value as an output current value at the present execution timing of this process in order to set the current value for the first step shown in FIG. 10A. Note that an execution timing refers to a time instant at which the output current value calculation process shown in FIGS. 9A and 9B is executed, while a calculation timing refers to a time instant at which the stepwise current control determination process shown in FIG. 8 is executed. The output current value at the present execution timing of this process will be hereinafter referred to as a present output current value. More specifically, the brake ECU 100 calculates the current value corresponding to the target W/C pressure calculated at the previous calculation timing. For example in the case shown in FIG. 10A, the target W/C pressure to be used has the value P1 and the current value calculated by using the increasing mapping dataset comes to have the value I1. Subsequently, the process proceeds to step 320 at which the adjusting portion 100e turns the first step flag to ON and return to step 300 to repeat this output current value process again.

At step 325, the adjusting portion 100e executes a sub-process for setting the current value for the second and further steps. More specifically, the adjusting portion 100e calculates the current value corresponding to the target W/C pressure calculated at the present calculation timing by using the increasing mapping dataset. Then the adjusting portion 100e makes a determination as to whether the calculated current value is larger than the output current value at the previous execution timing of this process. The output current value at the previous execution timing of this process will be hereinafter referred to as a previous output current value. In the case that the previous output current value is smaller than the current value corresponding to the target W/C pressure at the present calculation timing calculated based on the increasing mapping dataset, the amount of change of the current value is large and it is therefore necessary to control the current value to change in the stepwise manner. However, in the case that the previous output current value is larger than the current value corresponding to the target W/C pressure at the present calculation timing calculated based on the increasing mapping dataset, it is not necessary to change the current value in the stepwise manner. To implement this characteristic, adjusting portion 100e makes a determination at step 325 as to whether to change the current value in the stepwise manner.

If the determination at step 325 is affirmative, the process proceeds to step 330 at which the adjusting portion 100e calculates the present output current value. More specifically, the adjusting portion 100e determines the present output current value to be a sum of the previous output current value and a divided value which is obtained by dividing into three a difference of the current value corresponding to the target W/C pressure for the present calculation timing calculated based on the increasing map from the current value corresponding to the target W/C pressure for the previous calculation timing calculated based on the increasing map. For example, in the case shown in FIG. 10A, the previous output current value has the value I1, the current value corresponding to the target W/C pressure for the present calculation timing calculated based on the increasing map has the value I4, the current value corresponding to the target W/C pressure for the previous calculation timing calculated based on the increasing map has the value I1. Therefore, the present output current value becomes to have the value I1+(I4−I1)/3.

If the determination at step 325 is negative, the process proceeds to step 335 at which the adjusting portion 100e turns the stepwise flag to OFF, and further proceeds to step 340 at which it calculates the present output current value. Since it is not necessary in this case to calculate the present output current value in the stepwise manner, the present output current value is calculated, based on the increasing mapping dataset, to be the current value corresponding to the target W/C pressure.

At step 345 and the following steps, the adjusting portion 100e executes in the same manner as at steps 305 to 340, except for that the decreasing mapping dataset is used in place of the increasing mapping dataset, since step 345 and the following steps are executed in the condition that the selection of the mapping dataset has been changed from the forward mapping dataset to the backward mapping dataset.

As described above, the brake ECU 100 of the present embodiment detects a time instant at which the target W/C pressure switches between the decreasing process and the increasing process. The brake ECU 100 then changes the current value in a stepwise manner at the detected transition time instant in order to cope with a large amount of change in the current value for the first to fourth linear valves SLFR to SLRR.

Thus, as shown in FIG. 10A, the calculated value gradually changes in time, which prevents the driver from experiencing an uncomfortable brake feeling that the generated W/C pressure suddenly jumps up or down.

Fourth Embodiment

A fourth embodiment of the present invention will be explained. In this embodiment, a portion of the configuration of the vehicle brake control device is different from the configuration in the first embodiment, but the overall configuration is basically the same as that in the first embodiment, so only the parts which are different from the first embodiment will be explained.

Figure 11:
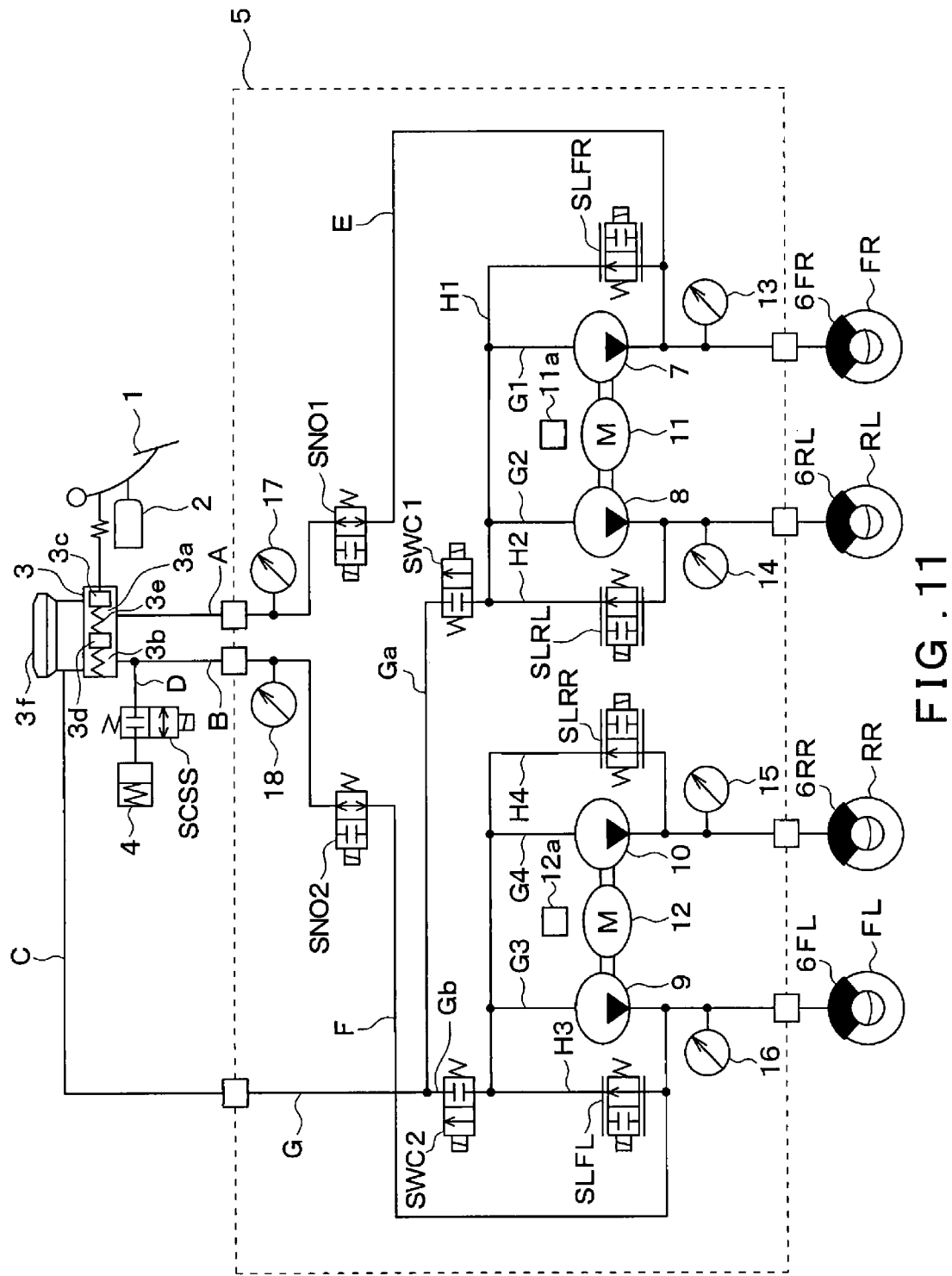
FIG. 11 is a diagram showing a hydraulic circuit configuration of a vehicle brake control device according to the fourth embodiment of the present invention.

FIG. 11 is a diagram showing a hydraulic circuit configuration of a vehicle brake control device according to this embodiment. As shown in FIG. 11, in the vehicle brake control device in this embodiment, the brake conduit G is divided into two brake conduits Ga and Gb. The first normally-closed valve SWC1 is located in the brake conduit Ga (that is, downstream of the dividing point of the conduits Ga and Gb and upstream of the brake conduits H1 and H2). The second normally-closed valve SWC2 is located in the brake conduit Gb (that is, downstream of the dividing point and upstream of the brake conduits H3 and H4).

The vehicle brake control device with the structure described above achieves the same effect as that of the first to third embodiments by executing the same control as that of the first to third embodiments.

In this configuration, even if the first normally-closed valve SWC1 is closed when an abnormality occurs, only the portion of the system on the upstream side of the brake conduits H1 and H2 is closed. Therefore, if the M/C pressure is generated in the primary chamber 3a of the M/C 3 because of depressing of a brake pedal 1, the M/C pressure can be transmitted not only to the W/C 6FR for the right front wheel FR, but also to the W/C 6RL for the left rear wheel RL. Likewise, even if the second normally-closed valve SWC2 is closed when an abnormality occurs, only the portion of the system on the upstream side of the brake conduits H3 and H4 is closed. Therefore, if the M/C pressure is generated in the secondary chamber 3b of the M/C 3 because of depressing of the brake pedal 1, the M/C pressure can be transmitted not only to the W/C 6FL for the left front wheel FL, but also to the W/C 6RR for the right rear wheel RR.

Thus, in the vehicle brake control device in this embodiment, it is possible to generate the W/C pressures in the W/Cs 6FR to 6RR for all four wheels FR to RR in the abnormal situation. Better balanced braking forces can therefore be generated.

In this embodiment, check valves 20 and 21, which were shown in the first embodiment, are not provided. However, the first and second normally-closed valves SWC1 and SWC2, which are located upstream of the pumps 7 and 9, can stop the brake fluid so that no drop occurs in the W/C pressures even if the brake fluid leaks from pumps 7 and 9.

Fifth Embodiments

A fifth embodiment of the present invention will be explained. In this embodiment, a portion of the configuration of the vehicle brake control device is different from the configuration in the fourth embodiment, but the overall configuration is basically the same as that in the fourth embodiment, so only the parts which are different from the fourth embodiment will be described.

Figure 12:
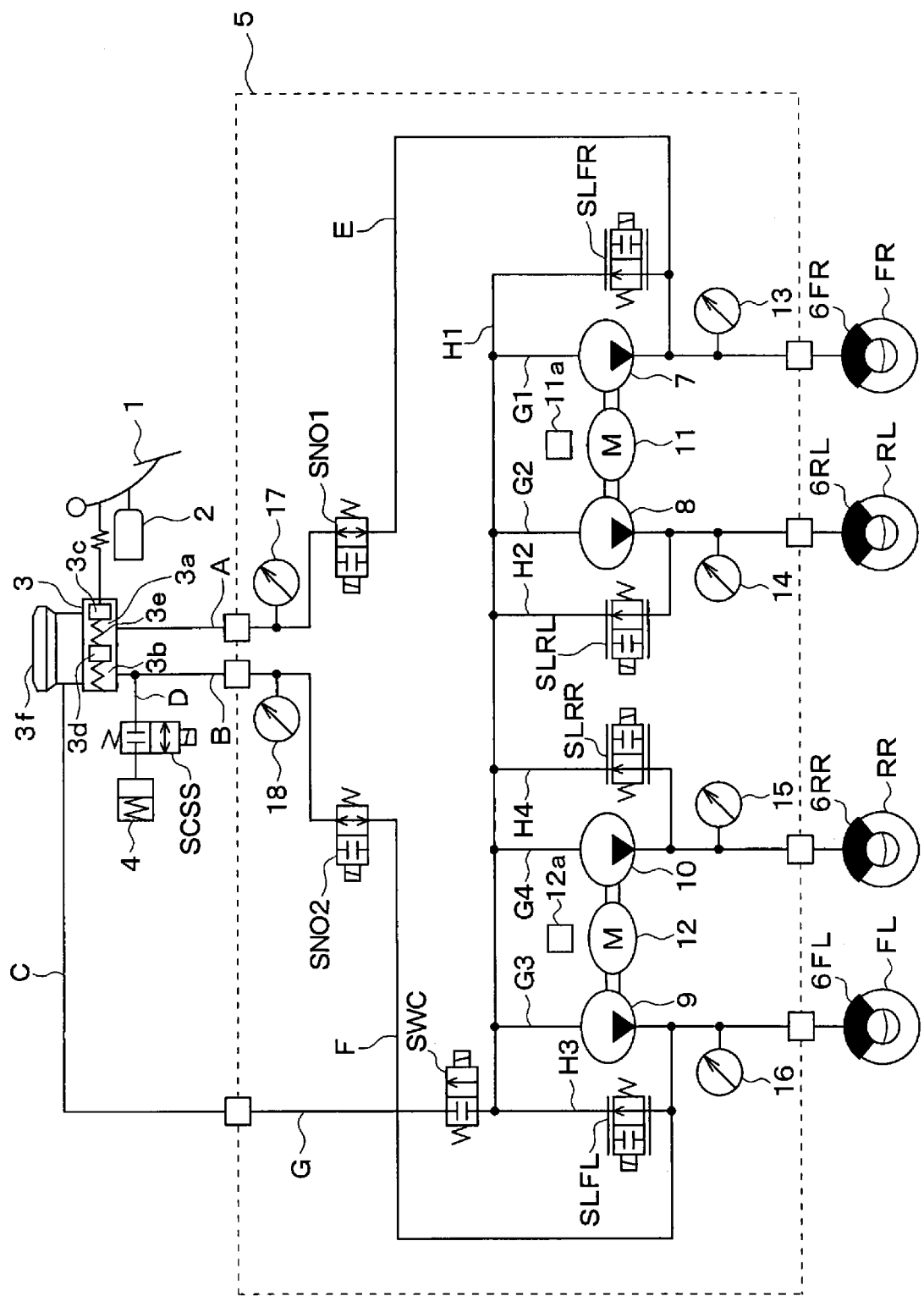
FIG. 12 is a diagram showing a hydraulic circuit configuration of a vehicle brake control device according to the fifth embodiment of the present invention.

FIG. 12 is a diagram showing a hydraulic circuit configuration of a vehicle brake control device according to this embodiment. As shown in FIG. 12, in the vehicle brake control device in this embodiment, the two conduit systems share a single normally-closed valve SWC, instead of the first and second normally-closed valves SWC1 and SWC2 provided in the first and fourth embodiments.

The vehicle control device with the structure described above achieves the same effect as that of the first to third embodiments by executing the same control as that of the first to third embodiments.

Even in this configuration, during the normal braking, W/C pressures in the W/Cs 6FR to 6RR for the four wheels FR to RR can be adjusted appropriately, and when an abnormality occurs, the M/C pressure that is generated in the M/C 3 according to depressing of a brake pedal 1 can be transmitted to the W/Cs 6FR to 6RR for the four wheels FR to RR.

In addition, the single normally-closed valve SWC is closed in the abnormal situation. The M/C pressure is accordingly transmitted to all wheels FR to RR in the two conduit systems. Therefore, it is possible to make the system configuration more compact.

In the vehicle brake control device in this embodiment, the way for driving the normally-closed valve SWC is the same as that for driving the first and second normally-closed valves SWC1 and SWC2 in the vehicle brake control device according to the first embodiment, as shown in FIG. 5.

Other Embodiment

In the above embodiment, the vehicle brake control device detects the amount of the operation of the brake pedal 1 based on the detection signal from the depression force sensor 2 and determines the target W/C pressure based on the detected amount of the operation. However, the vehicle brake control device does not have to detect the amount of the operation of the brake pedal 1 itself. The vehicle brake control device may determine the target W/C pressure based on change of a parameter depending on the amount of the operation. In this case, the change of the parameter is used as a quantity corresponding to the change of the amount of the operation of the brake pedal 1. For example, the W/C pressure may be determined based on the M/C pressure, which changes depending on the amount of the operation of the brake pedal 1 and is detected based on the detection signals from the pressure sensors 17 and 18.

In the third embodiment, when the current value changes by a large amount, the vehicle brake control device changes the current value in the stepwise manner in which the current value for the first step is determined based on the target W/C pressure at the previous calculation timing and on the increasing mapping dataset. The vehicle brake control device subsequently determines the current value for the second to fourth steps based on a W/C pressure which changes in three steps from the W/C pressure at the previous calculation timing to the W/C pressure at the present calculation timing. However, the vehicle brake control device of the present invention is not limited to the operation.

For example, the current value may be changed in steps other than the four steps. The current value may be changed in a stepwise manner by a value which is obtained by dividing the total amount of the change of the current value by the number of the steps. In this case, the above mentioned first step is omitted in which the current value is changed while fixing the target W/C pressure.

The increase/decrease pressure determination portion 100*f* and the second selecting portion 100*h* used in the second embodiment may be disused. In this case, the vehicle brake control device may select one of the increasing mapping dataset and the decreasing mapping dataset simply in accordance with whether the forward mapping dataset and backward mapping dataset is selected. More specifically, the vehicle brake control device may determine that the target W/C pressure is in the increasing process and may select the increasing mapping dataset when the forward mapping dataset described in the first embodiment is selected. The vehicle brake control device may also determine that the target W/C pressure is in the decreasing process and may select the decreasing mapping dataset when the backward mapping dataset described in the first embodiment is selected.

The vehicle brake control device shown in FIG. 1 is merely an example of the present invention. The vehicle brake control device of the present invention is not limited by that shown in FIG. 1, but may be modified in a variety of ways.

For example, in the first embodiment, examples were explained of vehicle brake control devices applied to a vehicle in which conduit systems include hydraulic circuits in an X conduit arrangement, with a conduit system connecting the left front and right rear wheels and another conduit system connecting the right front and left rear wheels. However, the present invention may also be applied to other systems, such as a front-and-rear conduit arrangement or the like.

In the above embodiments, the brake fluid is supplied to both the first conduit system and the second conduit system through the brake conduit C which is the only conduit connected with the master reservoir 3*f*. However, supplemental brake conduit other than the brake conduit C connected may be provided. In this case, the brake fluid may be supplied to the first conduit system through the brake conduit C and to the second conduit system through the supplemental brake conduit.

In the above embodiments, the M/C 3 is connected with the first conduit system and the second conduit system in case of the abnormal situation in which the first to four pumps 7 to 10 cannot generate pressure. In addition, in the above embodiments, the brake fluid, is supplied from the master reservoir 3*f* during the normal braking. However, the operation is merely an example of the present invention. The M/C 3 may be separated from the first conduit system and the second conduit system. The M/C 3 may be disused. The brake fluid may be supplied not from the master reservoir 3*f* but from another reservoir which can store the brake fluid.

Figure 13:
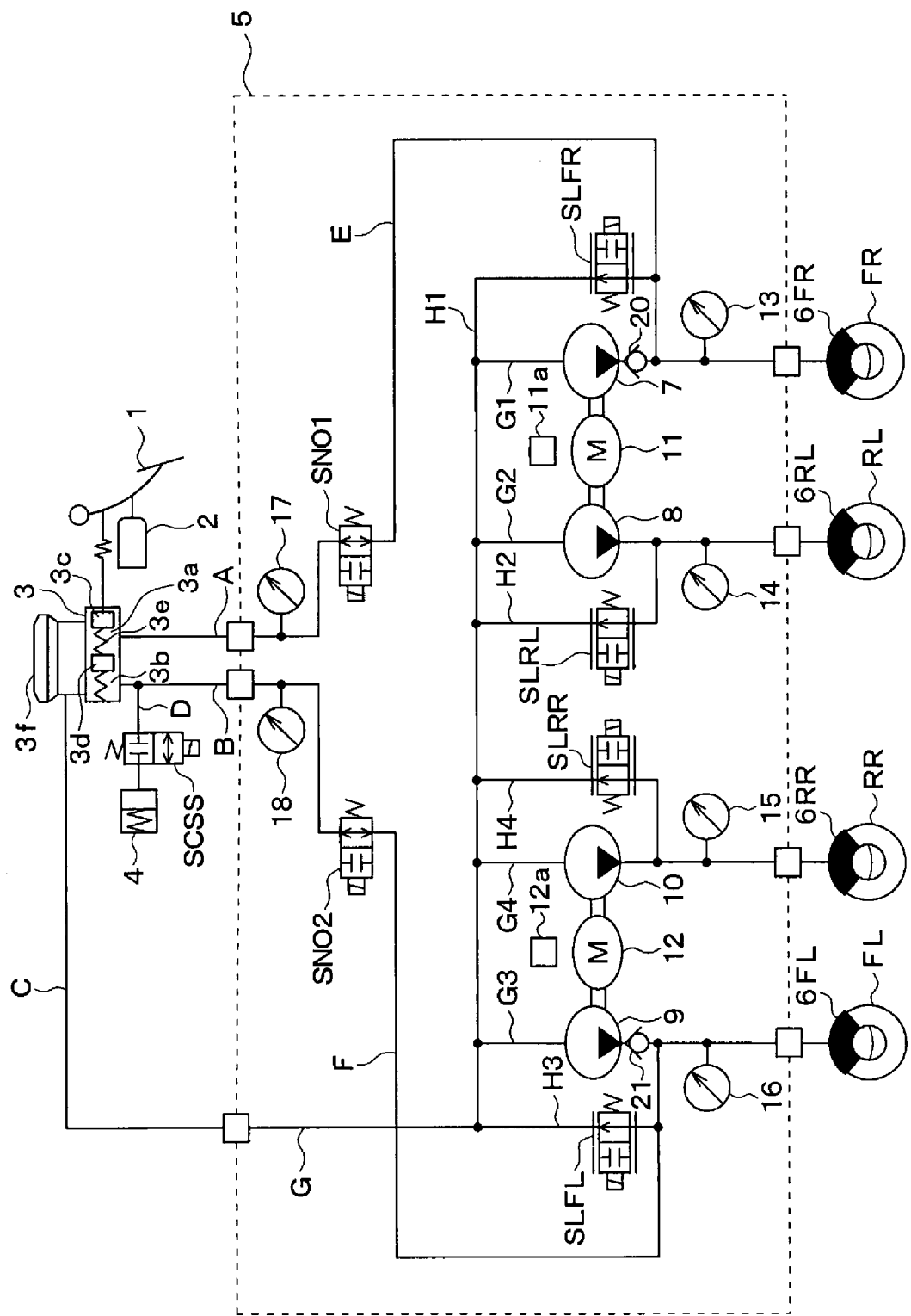
FIG. 13 is a diagram showing a hydraulic circuit configuration of a vehicle brake control device according to another embodiment of the present invention.

Also, in the preceding embodiments, even if the first to fourth linear valves SLFL to SLRR do not operate, the M/C pressure that is generated mechanically based on depressing of the brake pedal 1 is transmitted to the W/Cs 6FL, 6FR and the like in consideration of the need for fail-safe operation. However, if a location where an abnormality occurs is somewhere other than the first to fourth linear valves SLFL to SLRR, the first to fourth linear valves SLFL to SLRR can operate. So if electric power can be supplied to the first to fourth linear valves SLFL to SLRR so that the brake conduits H1 to H4 are closed (or, so that a pressure difference between an upstream and an downstream of each of the brake conduits H1 to H4 is maximized), it would be possible to transmit the M/C pressure to the W/Cs 6FL, 6FR and the like in the same manner as described above. Therefore, it is not necessarily the case that the first and second normally-closed valves SWC1, SWC2 or the single normally-closed valve SWC must be provided. As shown in the hydraulic circuit configuration shown in FIG. 13, a structure may also be used that is not provided with the first and second normally-closed valves SWC1, SWC2 or with the single normally-closed valve SWC.

However, in the sense that all fail-safe operations must be able to be executed mechanically, the first and second normally-closed valves SWC1 and SWC2 and the single normally-closed valve SWC are important.

Figure 14:
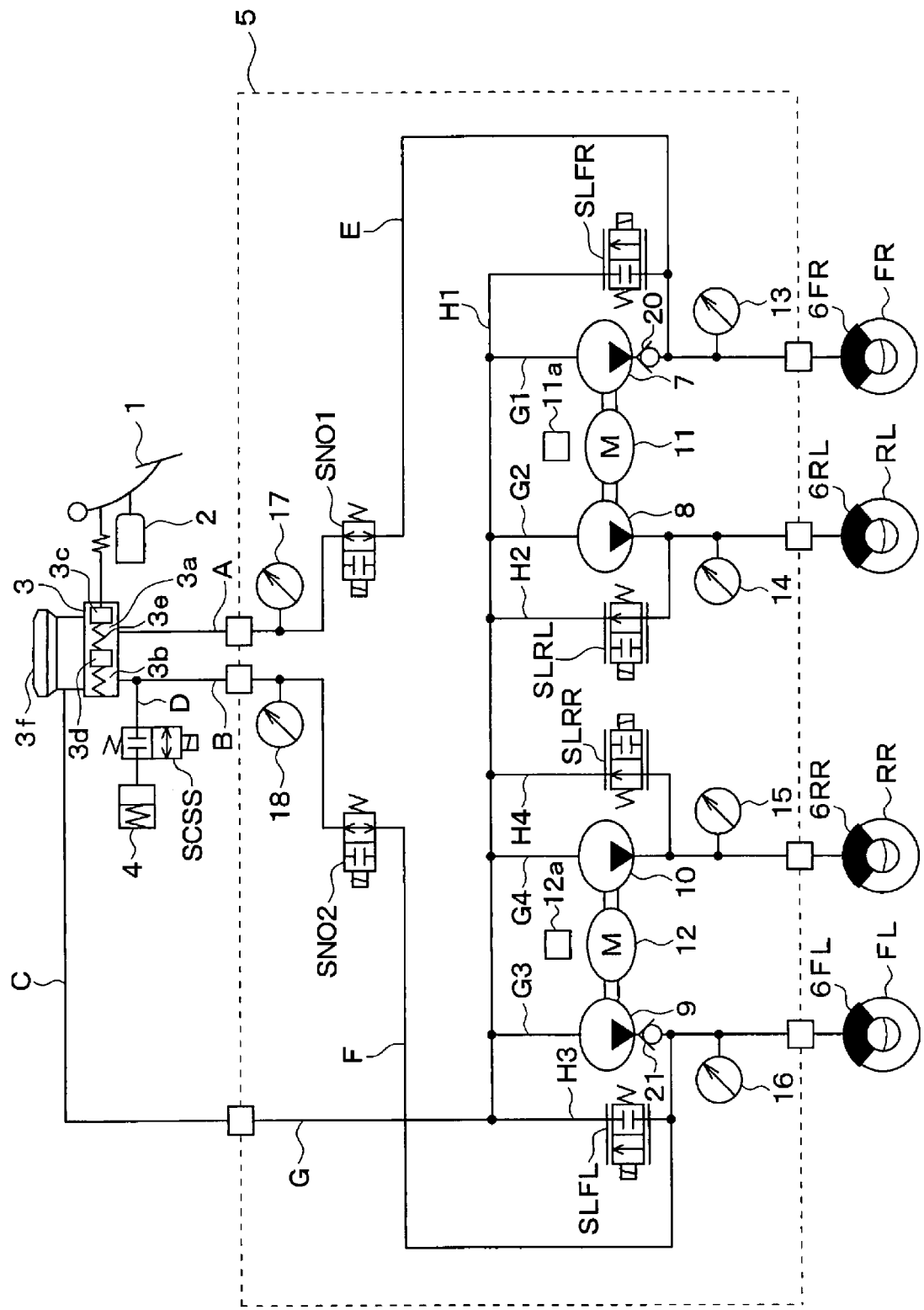
FIG. 14 is a diagram showing a hydraulic circuit configuration of a vehicle brake control device according to still another embodiment of the present invention.
Figure 15:
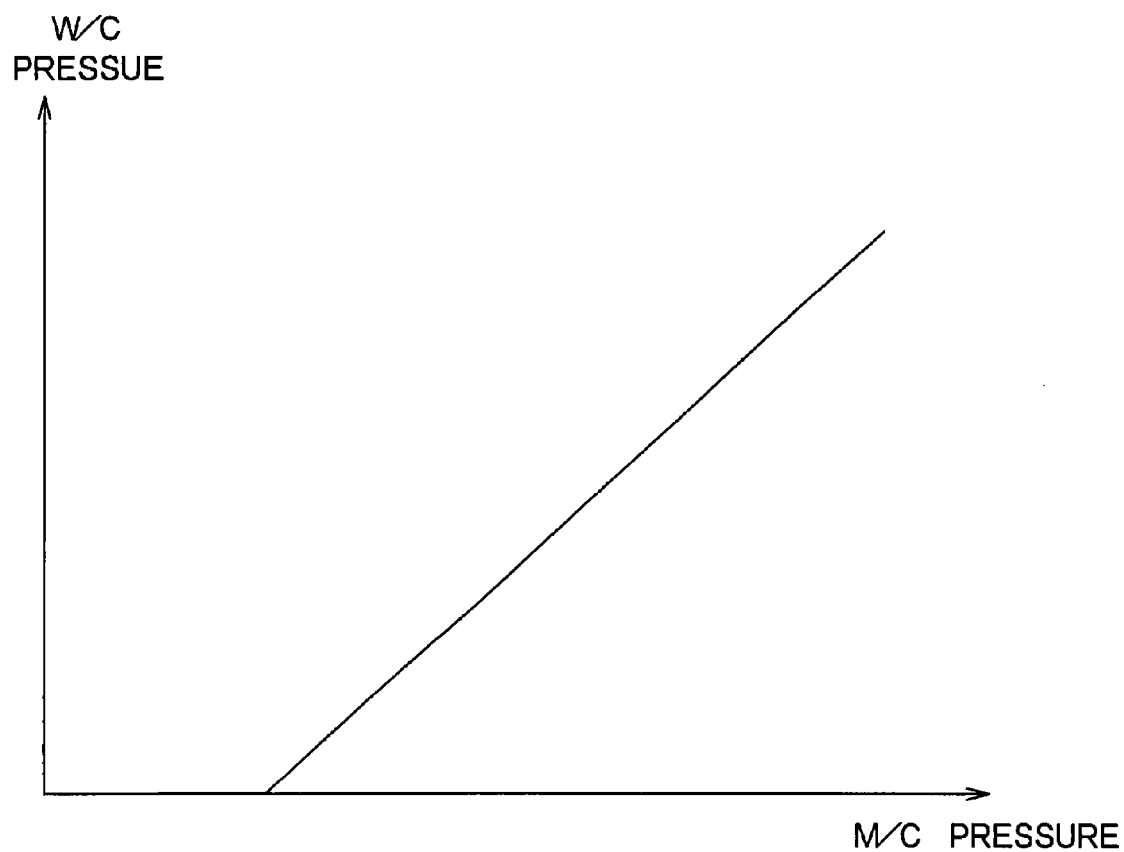
FIG. 15 is a graph showing a change of a W/C pressure against M/C pressure which changes depending on an amount of operation of a brake pedal.

Therefore, as shown in the hydraulic circuit configuration shown in FIG. 14, it is more preferable if the first linear valve SLFR and the third linear valve SLFL are configured as normally-closed linear valves, because the fail-safe operation can be executed mechanically. Of course, the second linear valve SLRL and the fourth linear valve SLRR may also be configured as normally-closed linear valves.

In the above embodiments, the brake pedal 1 serves as an example of a brake operating member. However, a brake lever and the like may serve as and example of the brake operating member.

What is claimed is:

1. A vehicle brake control device, comprising:
    a brake operating member to be operated by a driver;
    an operation amount sensor for detecting an operation amount of the brake operating member;
    a first and a second front wheel cylinder, which are respectively installed to two front wheels;
    a first and a second rear wheel cylinder, which are respectively installed to two rear wheels;
    a reservoir for storing brake fluid;
    a main conduit for connecting the first and second front wheel cylinders and the first and second rear wheel cylinders with the reservoir, the main conduit branching into four sections which are respectively connected with the first and second front wheel cylinders and the first and second rear wheel cylinders;
    a first pump located in a first one of the four sections, the first pump for pressurizing a first one of the first front wheel cylinder, the second front wheel cylinder, the first rear wheel cylinder, and the second rear wheel cylinder by drawing in and discharging the brake fluid stored in the reservoir;
    a second pump located in a second one of the four sections, the second pump for pressurizing a second one of the first front wheel cylinder, the second front wheel cylinder, the first rear wheel cylinder, and the second rear wheel cylinder by drawing in and discharging the brake fluid stored in the reservoir;
    a third pump located in a third one of the four sections, the third pump for pressurizing a third one of the first front wheel cylinder, the second front wheel cylinder, the first rear wheel cylinder, and the second rear wheel cylinder by drawing in and discharging the brake fluid stored in the reservoir;
    a fourth pump located in a fourth one of the four sections, the fourth pump for pressurizing a fourth one of the first front wheel cylinder, the second front wheel cylinder, the first rear wheel cylinder, and the second rear wheel cylinder by drawing in and discharging the brake fluid stored in the reservoir;

a first motor for driving the first and second pumps which are provided to a first conduit system of the main conduit and pressurize the first conduit system;

a second motor for driving the third and fourth pumps which are provided to a second conduit system of the main conduit and pressurize the second conduit system;

first to fourth adjustment conduits, which are located respectively in parallel with the first to fourth pumps and return the brake fluid to the reservoir;

first to fourth linear valves, which are respectively located in the first to fourth adjustment conduits; and control means for controlling, based on a detection signal from the operation amount sensor, the first to fourth linear valves, the first motor, and the second motor, wherein the control means includes:

a first storing portion for storing a forward mapping dataset and a backward mapping dataset each for indicating change of a wheel cylinder pressure generated at one of the first front wheel, the second front wheel, the first rear wheel, and the second rear wheel, the change being in accordance with the operation amount, wherein:

the forward mapping dataset is for an operation increasing process in which the operation amount increases; and the backward mapping dataset is for an operation decreasing process in which the operation amount decreases and exhibits hysteresis against the forward mapping dataset;

a first selecting portion for selecting one of the forward mapping dataset and the backward mapping dataset based on the operation amount detected by the operation amount sensor;

a pressure calculating portion for calculating, based on the selected one of the forward mapping dataset and the backward mapping dataset, a target wheel cylinder pressure corresponding to the detected operation amount; and an adjusting portion for adjusting, based on the calculated target wheel cylinder pressure, a current value of a current to be supplied to one of the first to fourth linear valves.

2. A vehicle brake control device, comprising:

a brake operating member to be operated by a driver;

an operation amount sensor for detecting an operation amount of the brake operating member;

a first and a second front wheel cylinder, which are respectively installed to two front wheels;

a first and a second rear wheel cylinder, which are respectively installed to two rear wheels;

a reservoir for storing brake fluid;

a main conduit for connecting the first and second front wheel cylinders and the first and second rear wheel cylinders with the reservoir, the main conduit branching into four sections which are respectively connected with the first and second front wheel cylinders and the first and second rear wheel cylinders;

a first pump located in a first one of the four sections, the first pump for pressurizing a first one of the first front wheel cylinder, the second front wheel cylinder, the first rear wheel cylinder, and the second rear wheel cylinder by drawing in and discharging the brake fluid stored in the reservoir;

a second pump located in a second one of the four sections, the second pump for pressurizing a second one of the first front wheel cylinder, the second front wheel cylinder, the first rear wheel cylinder, and the second rear wheel cylinder by drawing in and discharging the brake fluid stored in the reservoir;

a third pump located in a third one of the four sections, the third pump for pressurizing a third one of the first front wheel cylinder, the second front wheel cylinder, the first rear wheel cylinder, and the second rear wheel cylinder by drawing in and discharging the brake fluid stored in the reservoir;

a fourth pump located in a fourth one of the four sections, the fourth pump for pressurizing a fourth one of the first front wheel cylinder, the second front wheel cylinder, the first rear wheel cylinder, and the second rear wheel cylinder by drawing in and discharging the brake fluid stored in the reservoir;

a first motor for driving the first and second pumps which are provided to a first conduit system of the main conduit and pressurize the first conduit system;

a second motor for driving the third and fourth pumps which are provided to a second conduit system of the main conduit and pressurize the second conduit system;

first to fourth adjustment conduits, which are located respectively in parallel with the first to fourth pumps and return the brake fluid to the reservoir;

first to fourth linear valves, which are respectively located in the first to fourth adjustment conduits;

control means for controlling, based on a detection signal from the operation amount sensor, the first to fourth linear valves, the first motor, and the second motor; and a pressure sensor for outputting a detection signal corresponding to a fluid pressure of brake fluid changing in accordance with an operation amount of the brake operation member;

wherein the control means includes:

a first storing portion for storing a forward mapping dataset and a backward mapping dataset each for indicating change of a wheel cylinder pressure generated at one of the first front wheel, the second front wheel, the first rear wheel, and the second rear wheel, the change being in accordance with the operation amount, wherein:

the forward mapping dataset is for an operation increasing process in which the operation amount increases; and the backward mapping dataset is for an operation decreasing process in which the operation amount decreases and exhibits hysteresis against the forward mapping dataset;

a first selecting portion for selecting one of the forward mapping dataset and the backward mapping dataset based on the operation amount detected by means of the detection signal from the pressure sensor;

a target pressure calculating portion for calculating, based on the selected one of the forward mapping dataset and the backward mapping dataset, a target wheel cylinder pressure corresponding to the detected operation amount; and an adjusting portion for adjusting, based on the calculated target wheel cylinder pressure, a current value of a current to be supplied to the one of the first to fourth linear valves.

3. The vehicle brake control device according to claim 1, wherein the first selecting portion selects the forward mapping dataset when the operation amount is zero.

4. The vehicle brake control device according to claim 1, further comprising a forward/backward pressure calculating portion for calculating, based on the forward mapping dataset, a forward wheel cylinder pressure corresponding to the operation amount and calculating, based on the backward mapping dataset, a backward wheel cylinder pressure corresponding to the operation amount, wherein the first selecting portion:
performs when the forward mapping dataset is selected:
selecting the larger one of the forward wheel cylinder pressure and a previously calculated target wheel cylinder pressure as a first wheel cylinder pressure; and
selecting the backward wheel cylinder pressure as a second wheel cylinder pressure,
performs when the backward mapping dataset is selected:
selecting the forward wheel cylinder pressure as the first wheel cylinder pressure; and
selecting the smaller one of the backward wheel cylinder pressure and the previously calculated target wheel cylinder pressure as the second wheel cylinder pressure,
compares the first wheel cylinder pressure and the second wheel cylinder pressure, and
switches a selection of one of the forward mapping dataset and the backward mapping dataset when the first wheel cylinder pressure is larger than the second wheel cylinder pressure.

5. The vehicle brake control device according to claim 1, wherein the control means further includes:
a determination portion for determining whether the calculated target wheel cylinder pressure is in a pressure increasing process in which the target wheel cylinder pressure is increasing or in a pressure decreasing process in which the target wheel cylinder pressure is decreasing;
a second storing portion for storing an increasing mapping dataset and a decreasing mapping dataset each for indicating change of the current value of the current to be supplied to the one of the first to fourth linear valves, the change being in accordance with the calculated target wheel cylinder pressure, wherein:
the increasing mapping dataset is for use in the pressure increasing process; and
the decreasing mapping dataset is for use in the pressure decreasing process and exhibits hysteresis against the increasing mapping dataset; and
a second selecting portion for selecting one of the increasing mapping dataset and the decreasing mapping dataset based on the calculated target wheel cylinder pressure,
wherein the adjusting portion calculates, based on the calculated target wheel cylinder pressure and on the selected one of the increasing mapping dataset and the decreasing mapping dataset, the current value to be supplied to the one of the first to fourth linear valves.

6. The vehicle brake control device according to claim 5, wherein the adjusting portion executes, when a selection of one of the forward mapping dataset and the backward mapping dataset made by the first selecting portion changes, a stepwise current control in which the current value to be supplied to the one of the first to fourth linear valves is changed is in a stepwise manner.

7. The vehicle brake control device according to claim 5, wherein the adjusting portion performs at the first step in the stepwise current control:
calculating a first current value based on the target wheel cylinder pressure calculated previously by the pressure calculating portion and on one of the forward mapping dataset and the backward mapping dataset which is previously selected by the first selecting portion;
calculating a second current value based on the target wheel cylinder pressure calculated previously by the pressure calculating portion and on one of the forward mapping dataset and the backward mapping dataset which is presently selected by the first selecting portion; and
changing the current value to be supplied to the one of the first to fourth linear valves from the first current value to the second current value.

8. The vehicle brake control device according to claim 7, wherein the adjusting portion performs at the second and following steps in the stepwise current control:
calculating a third current value based on the target wheel cylinder pressure calculated presently by the pressure calculating portion and on the one of the forward mapping dataset and the backward mapping dataset which is presently selected by the first selecting portion; and
changing the current values to be supplied to the one of the first to fourth linear valves in a series of multiple discrete steps between the second current value and the third current value.

* * * * *